United States Patent [19]
Gutierrez et al.

[11] Patent Number: 6,162,555
[45] Date of Patent: Dec. 19, 2000

[54] PARTICLE FEEDING APPARATUS FOR ELECTROCHEMICAL POWER SOURCE AND METHOD OF MAKING SAME

[75] Inventors: Bernardo A. Gutierrez, San Diego; Jeffrey A. Colborn, Cardiff-by-the-Sea; Stuart I. Smedley; Kent I. Smedley, both of Escondido, all of Calif.

[73] Assignee: Metallic Power, Inc., Carlsbad, Calif.

[21] Appl. No.: 09/353,422

[22] Filed: Jul. 15, 1999

[51] Int. Cl.[7] .......................... H01M 2/36; H01M 12/06
[52] U.S. Cl. .................. 429/15; 429/27; 429/68; 429/70
[58] Field of Search .................. 429/15, 27, 68, 429/70; 141/102

[56] References Cited

U.S. PATENT DOCUMENTS

| | | |
|---|---|---|
| 3,663,298 | 5/1972 | McCoy et al. . |
| 3,811,952 | 5/1974 | Siwersson et al. . |
| 3,847,671 | 11/1974 | Leparulo et al. . |
| 3,902,918 | 9/1975 | Pompon . |
| 3,981,747 | 9/1976 | Doniat et al. ............... 429/15 |
| 3,985,581 | 10/1976 | Stachurski et al. ............ 429/15 |
| 4,172,924 | 10/1979 | Warszawski ............... 429/15 |
| 4,182,383 | 1/1980 | Adomitis et al. .......... 141/102 X |
| 4,198,475 | 4/1980 | Zaromb . |
| 4,287,273 | 9/1981 | Harney et al. . |
| 4,730,153 | 3/1988 | Breting et al. . |
| 4,842,963 | 6/1989 | Ross, Jr. . |
| 5,006,424 | 4/1991 | Evans et al. . |
| 5,168,905 | 12/1992 | Phallen ................. 141/102 X |
| 5,188,911 | 2/1993 | Downing et al. ............ 429/70 |
| 5,318,861 | 6/1994 | Harats et al. . |
| 5,360,680 | 11/1994 | Goldman et al. . |
| 5,378,329 | 1/1995 | Goldstein et al. . |
| 5,434,020 | 7/1995 | Cooper . |
| 5,441,820 | 8/1995 | Siu et al. . |
| 5,558,947 | 9/1996 | Robison . |
| 5,569,551 | 10/1996 | Pedicini et al. . |
| 5,578,183 | 11/1996 | Cooper . |
| 5,635,051 | 6/1997 | Salas-Morales et al. . |
| 5,849,427 | 12/1998 | Siu et al. . |
| 5,869,200 | 2/1999 | Nunnally . |

FOREIGN PATENT DOCUMENTS

| | | |
|---|---|---|
| 2 639 767 A1 | 6/1990 | France . |
| 2 669 775 A1 | 5/1992 | France . |
| 51-49439 | 10/1974 | Japan ........................ 429/70 |

OTHER PUBLICATIONS

Cooper et al., Demonstration of a Zinc/Air Fuel Battery to Enhance the Range and Mission of Fleet Electric Vehicles . . . LLNL Preprint Paper No. AIAA—94–3841, Aug. 8, 1994.

Cooper et al., A Refuelable Zinc/Air Battery for Fleet Electric Vehicle Propulsion, SAE International. Paper No. 955148 , Aug. 7–10, 1995.

Unknown Author, How the Zinc/Air Battery is Refueling the Competitiveness of Electric Vehicles, LLNL Publication. Science & Technology Review, Oct. 1995, pp. 7–13.

*Primary Examiner*—Stephen Kalafut
*Attorney, Agent, or Firm*—Howrey Simon Arnold & White, LLP

[57] ABSTRACT

A novel fuel particle feeding mechanism that significantly improves operation of a refuelable electrochemical power source is provided. One embodiment of the mechanism provides an input of electrolyte and electrochemically active particles into one or more electrochemical cells through a feed tube. The feed tube has several embodiments that improve the flow of electrolyte and particles, and the even and complete settling of particles into individual cell cavities. Each cell cavity is completely filled, evenly and without clogging when open, and fluid communication between cell cavities is completely cut off when closed, to prevent short-circuiting of the power source during discharge or standby. Means are provided to prevent clogging of the feed tube with fuel particles, to promote complete filling of the cell cavities with fuel, and to prevent fuel particles from prematurely flowing out of the cell cavities. A method of operation is also described.

55 Claims, 12 Drawing Sheets

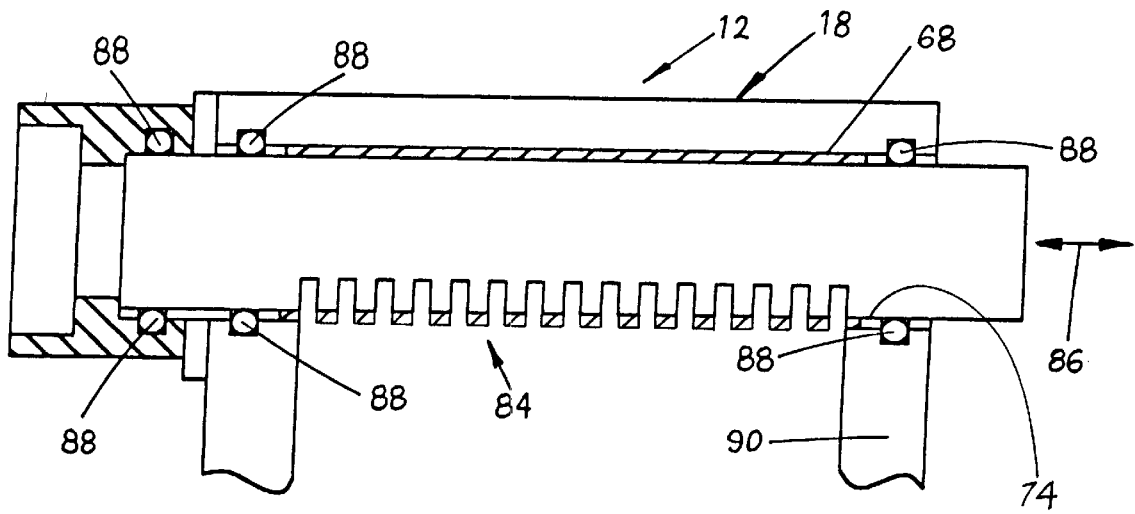
Fig. 8
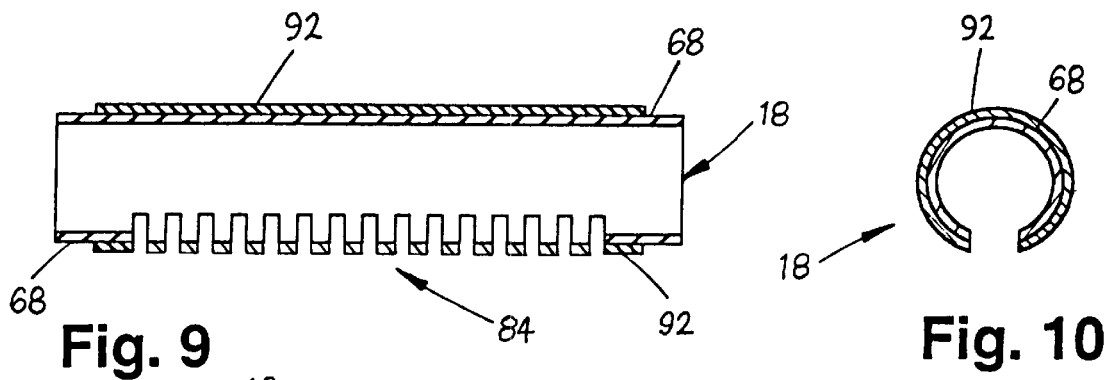
Fig. 9
Fig. 10
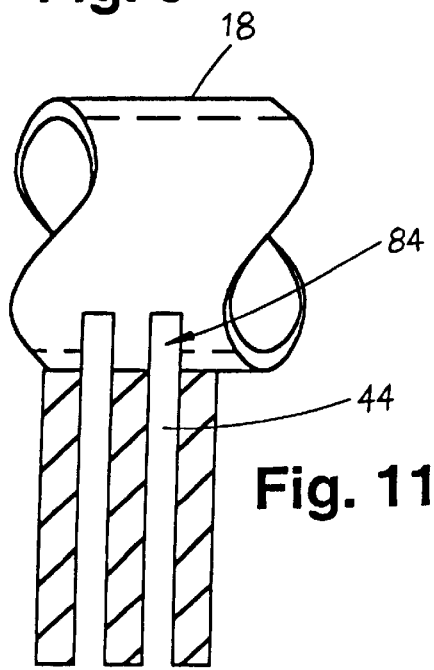
Fig. 11
Fig. 12

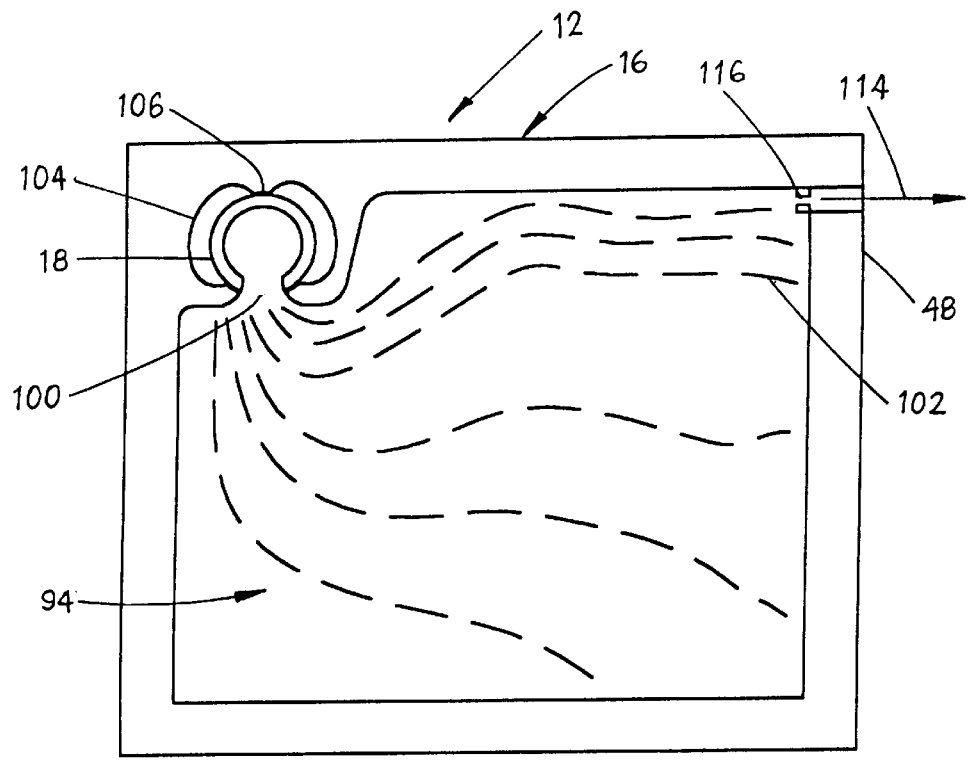
Fig. 17
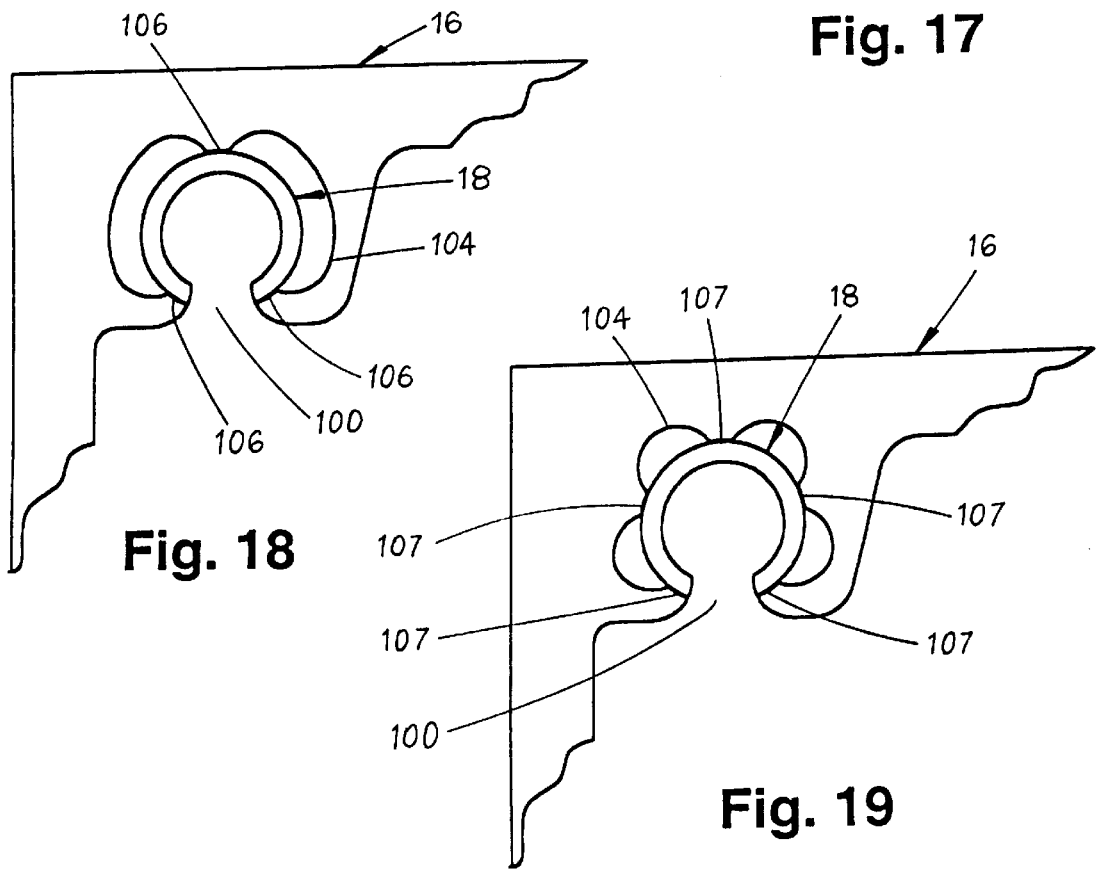
Fig. 18
Fig. 19

PARTICLE FEEDING APPARATUS FOR ELECTROCHEMICAL POWER SOURCE AND METHOD OF MAKING SAME

BACKGROUND OF THE INVENTION

1. Field of the Invention

The present invention relates generally to electrochemical power sources. More particularly, the present invention relates to a fuel particle feeding apparatus that provides zinc fuel particles into a rechargeable zinc/air power source.

2. Description of the Related Art

There has been a renewed interest in zinc/air batteries for electric vehicle propulsion because of the unique combination of high-energy density and low hardware cost. If the zinc/air battery can be made mechanically rechargeable by a simple and rapid technique, the battery can provide an electric vehicle with unlimited range extension, without resorting to slow electrical recharge, battery exchange, component replacement, or combustion engine hybrids. The option of mechanical recharge or refueling is important in fleet electric vehicles such as shuttle buses and delivery vans and other industrial or enclosure-operated vehicles, which often must operate over eight hours each day to effectively return the high cost of the vehicle. Using battery exchange methodologies essentially doubles the battery investment, while range extension using combustion engines defeats the primary purpose of emission-less power sources.

It is possible to divide mechanically-recharged battery concepts into two groups: (1) reconstructible cell batteries, and (2) refuelable cell batteries. Reconstructible cell batteries are characterized by the physical removal and refurbishing of battery components such as anode plates or cassettes, or even unit cells. Reconstructible cell batteries have been developed by Electric Fuel, Ltd. of Israel, and have demonstrated ranges of over 260 miles in delivery vans in Germany and Italy. Anode cassettes are moved (along with unconsumed zinc and zinc-oxide by-products) by robotics and reconstructed at an industrial plant. Advantages of simplicity must be balanced against the cost of industrial infrastructure. Moreover, anode consumption is incomplete and the cells are incapable of partial recharge.

Refuelable batteries use an electrochemical fuel, which is pumped into the battery in a manner that is similar to refueling an automobile. For this reason, they are often referred to as fuel cells or regenerative fuel cells. All cell hardware remains on the vehicle and is undisturbed by the refueling operation. The purpose of seeking a refueling technology is to eliminate the cumbersome battery replacement operation and requirements for centralized industrial infrastructure to support vehicle operation. Unlike cell reconstruction, the recovery of zinc from battery reaction products as a fuel can be accomplished using small-scale electrolysis equipment that is owned and operated by the fleet and conveniently located at the fleet's home base. Examples of refuelable batteries are the CGE zinc/air slurry battery and the concepts proposed by Evans or Alcazar or Cooper.

Prior art attempts to develop a rapidly refuelable zinc/air power source have met with limited success. One of the most important factors limiting the development of zinc/air fuel cells is the need for a convenient, rapid method for completely refueling the fuel cell.

Most of the prior art relates to methods of refueling a single cell and is thus not concerned with the rapid and complete refueling of a large number of cells in a stack.

Some of the related prior art includes the following U.S. Patents Cooper, Pat. No. 5,434,020; Nunnally, Pat. No. 5,869,200; Siu, et al. Pat. No. 5,849,427; Siu, et al. Pat. No. 5,441,820; Evans, et al. Pat. No. 5,006,424; and Leparulo, et al. Pat. No. 3,847,671, all of which are incorporated herein by reference.

Cooper discloses an electrochemical cell with a tapered cell cavity for gravity feeding of fuel particles. Included in his disclosure is means for refilling fuel particle storage hoppers by hydraulic means. However, Cooper does not describe a practical method or apparatus for carrying out a hydraulic refueling operation. Additionally, the typical prior art hopper and feeding channel geometry shown in Pat. No. 5,434,020 and publications, (Society of Automotive Engineers Publication No. 951948 and Science & Technology Review, Oct. 1995 p. 8 published by Lawrence Livermore National Laboratory) uses a rapid electrolyte flow through the feed tubes and perpendicular to the plane of the fuel cell hoppers with a return path and no means for high speed electrolyte flow down into and parallel to the plane of the fuel storage hoppers. One drawback to this method is that it does not completely fill the storage hoppers because the particles simply fall into one end of the hoppers as they fall out of the rapidly flowing feed tube above and "mound" in the hoppers. The fragility of the separators between the fuel cell cavities in Cooper also teaches against an electrolyte flow into and parallel to the plane of the fuel cell hoppers. See U.S. Pat. No. 5,434,020, Col. 2, 11. 61–65.

Nunnally, Pat. No. 5,869,200 discloses a magnetic slurry fueled battery system with a magnetic field used to hold microparticle spheres to the battery cell electrode plates. One disadvantage is the complexity of the disclosed system. The complexity results in a higher cost system, and a higher potential for failure within such a complex system, when compared to other prior art technologies or the present invention. Another disadvantage is the need to use fuel particles containing ferromagnetic or permanently magnetic cores. This greatly increases the cost of the fuel. In any event, Nunnally does not disclose a method for ensuring rapid and complete refueling of cells or fuel storage hoppers.

Siu et al. Pat. No. 5,849,427 discloses a hydraulically refueled battery. A major disadvantage is the requirement for a shut-off valve on each cell to terminate refueling of each cell. For an electric vehicle, this would require hundreds of small valves. Therefore, higher costs are required, a large storage area for installation is required, and the real possibility of system failure exists because of the complexity of design.

Siu et al. Pat. No. 5,441,820 discloses an electrically recharged battery employing a spouted particle bed. A spouted bed as defined in this invention, is one where recirculation from a pump causes an upward flow in the electrolyte in a "draft tube". The purpose of the upward flow is to entrain particles and carry them to the top of the particle bed, plus keeping the bed in constant motion. Therefore, the metal particles are kept from agglomerating during recharge. No means for hydraulically refueling the cell is described.

Evans, et al. Pat. No. 5,006,424 discloses a battery using gravity to feed electrolyte and particles with a key feature being creating convective forces to recycle the electrolyte based on density. No method or apparatus for refueling this battery is described.

Leparulo et al. Pat. No. 3,847,671 discloses a hydraulically refuelable battery system. This device is so constructed that both solid and liquid content must be routinely drained from each cell after discharge, and prior to refueling. Some disadvantages to this design include the use of separate hydraulic hardware (valves, etc.) for each cell to provide a complex and large system. Therefore, a large storage area is required in addition to a relatively higher cost over some prior art systems.

In summary, despite many attempts, the known prior art has still not solved the problems associated with delivering metal particles to metal-anode-based refuelable cell stacks. These problems include slow refueling cycle times, mounding of particles in the cell hoppers, lack of uniform distribution of particles in the cell hoppers, clogging of metal fuel particles, excessive hardware complexity, uneven fill profiles, piling up of fuel particles, and overall slow or otherwise inefficient fuel particle feeding operations. Therefore, it is clear that a need exists for an improved fuel particle feeding mechanism. The present novel invention of a particle feeding mechanism, and the process of making and operating it, does provide numerous novel features that solve these problems and eliminates these disadvantages.

SUMMARY OF THE INVENTION

A need exists for new and improved technology and design approaches to rapid and efficient zinc fuel particle feeding into refuelable battery cell stacks. The present invention addresses the above-mentioned problems in the prior art and provides novel solutions to these numerous long-standing problems. The Applicant believes the present invention elegantly overcomes these many long-standing and even ignored problems and disadvantages found in the prior art, either singly or in combination.

Therefore, it is an object of this present invention to provide a fuel particle feeding mechanism that will prevent clogging by fuel particles during refueling. Another object is to prevent mounding of particles in the cell cavities. Still another object is to achieve substantially uniform distribution of particles within the cell cavities. It is another object of the present invention to prevent shorting of the fuel cell by isolating individual cell cavities within a fuel cell during fuel cell discharge. It is still another object to provide a simple refueling mechanism to ensure low cost and ease of operation. It is yet another objective of the present invention to provide a high speed, high efficiency feed mechanism. Still another objective is to prevent deterioration or destruction of the electrodes, cell cavities, and feed mechanism components by monitoring internal pressure and stopping refueling prior to cell damage. It is an object of the present invention to provide a simple and rapid refueling system that is inexpensive to manufacture in large numbers for common use. Finally an object of the subject invention is to achieve the foregoing objects, singly or in combination.

The above-mentioned difficulties and problems of the prior art are overcome by the present invention. The present invention is a fuel particle feed mechanism that significantly improves operation of a refuelable zinc/air fuel cell. A key aspect of the present invention is a fuel particle feed system in which particles are dispensed into the cavities by a flow, whether fluid, pneumatic, or liquid, into and parallel to the plane of the cell cavities. The result is that mounding of particles in the cell cavities is prevented, and a more complete filling of the cell cavities results. In one implementation, the system includes a dispensing head coupled to a source of a slurry comprising a mixture of the particles in the electrolyte. The system is configured such that, in a first mode of operation, transverse flow of the slurry through the dispensing head is provided in a direction perpendicular to the plane of the cell cavities while, in a second mode of operation, the flow of the slurry is directed from the dispensing head into the cell cavities in a direction parallel to the plane of the cell cavities with no more than an insubstantial, i.e., no more than 20%, flow of the slurry in the transverse direction. In this second mode of operation, compared to conventional methods, the system achieves a more complete and more uniform distribution of particles within the cell cavities, and avoids mounding of the particles in the cell cavities.

In one implementation example, damage to the walls of the cell cavities due to the electrolyte flow through the cavities is prevented through the use of metal foam supports placed between two cavity walls in a sandwich arrangement. These supports strengthen the cavity walls, enabling them to withstand the hydraulic forces created by the electrolyte flow through and into the cell cavities.

Another key feature of this novel invention is that it provides a simple high efficiency system compared to prior art. More specifically, this key novel feature of the present invention provides a feed tube in a plurality of embodiments to quickly deliver electrolyte and fuel particles to a fuel cell stack.

A key objective of the present invention is to prevent channel blockage and to prevent electrode and cell damage from excessive electrolyte pressure. The present invention accomplishes this objective through this novel feed tube and an electrolyte bypass feature.

Essentially, the mechanism provides an input of electrolyte and fuel particles into a fuel cell through a feed tube. The feed tube has several embodiments that improve the flow of electrolyte and fuel particles into the individual fuel cell cavities. Each cell cavity may be completely active, or the upper part of each cell cavity may be a "storage hopper" and the lower portion the active part in which the fuel particles are consumed. The fuel particles feed by gravity from the storage hoppers into the active part of each cell as the fuel in the active part is consumed. The space within each cell cavity is completely filled with fuel particles in an even fashion without piling up of fuel particles. When the feeding mechanism is in the closed position, each cell cavity is completely isolated from fluid communication with any other cell cavity. Means are provided to prevent over-pressurizing the cell cavities, and to prevent fuel particles from flowing out of the cell cavities. The method of operation is also novel and simple.

Now in summary, the novel characteristics and features of one embodiment of the present fuel particle feeding mechanism include: a dispensing system which is configured to dispense particles into the cell cavities through a flow, whether fluid, pneumatic, or liquid, which occurs into and parallel to the plane of the cell cavities, a fuel particle feed tube with a plurality of embodiments, a pressure sensing mechanism, a driver system of the feed tube, an isolation feature of the feed tube, and means for allowing electrolyte flow into the cells to improve the complete filling of the fuel hoppers with fuel, an electrolyte bypass feature, and a fuel particle screen with multiple positioning and multiple embodiments.

Therefore, the novel features of this invention result in an improved refueling system for zinc/air batteries using a novel fuel particle feed mechanism. These, and other, features and advantages of the present invention are set forth more completely in the accompanying drawings and the following description.

BRIEF DESCRIPTION OF THE DRAWINGS

The above mentioned and other objects and features of this invention and the manner of attaining them will become apparent, and the invention itself will be best understood by reference to the following description of the embodiments of the invention in conjunction with the accompanying drawings, wherein closely related elements have the same number but different alphabetical suffixes, and further wherein:

FIG. 8 is a schematic partial side section view of the notched feed tube illustrating axial movement of the feed tube, in addition to seals within the feed tube housing;

FIG. 9 is a schematic partial side section view of the feed tube illustrating a coated feed tube;

FIG. 10 is a partial section end view of the feed tube illustrating the coated feed tube;

FIG. 11 is an enlarged schematic partial side view of an alternative design for axial feed tube operation illustrating the open position of the feed tube;

FIG. 12 is an enlarged schematic partial side view of an alternative design for axial feed tube operation illustrating the closed position of the feed tube;

FIG. 17 is a schematic end view of the fuel cell illustrating one embodiment for optimized fuel particle flow;

FIG. 18 is an enlarged schematic partial cutaway end view of one embodiment of the feed tube cavity design;

FIG. 19 is an enlarged schematic partial cutaway end view of a second embodiment of the feed tube cavity design;

DESCRIPTION OF THE PREFERRED EMBODIMENTS

A fuel particle feeding mechanism has been developed with the purpose of refueling cell stacks. The following description explains the principles and method of operation of the mechanism. The purpose of the present invention is to provide an improved and novel apparatus to solve long-standing problems in the field of refueling cell stacks with particulate fuel. In a zinc/air battery, the typical cell stack is made out of individual cells. Each cell has a compartment or cavity that is initially filled with fuel (typically zinc) particles using the means described herein or any other available means. After several hours of operating, the cell fuel particle level goes down and refueling is necessary.

The zinc fuel particles of approximately 0.020 inches to 0.040 inches in diameter are stored in a container, separate from the fuel cell stack. No matter the usage rate, low or high, it is desirable that the mechanism fill the cell to the maximum fuel particle fill level. The fuel level in each cell cavity can be anywhere from completely empty to completely full. Each cell has to be completely sealed from other cells after refueling. Otherwise, during battery discharge, shorting of the system occurs causing shutdown of the battery. Furthermore, it is desirable to shut off the air supply to the cells during refueling because the cells are shorted together during refueling by electrolyte and fuel passing through the feed tube.

Figure 20:
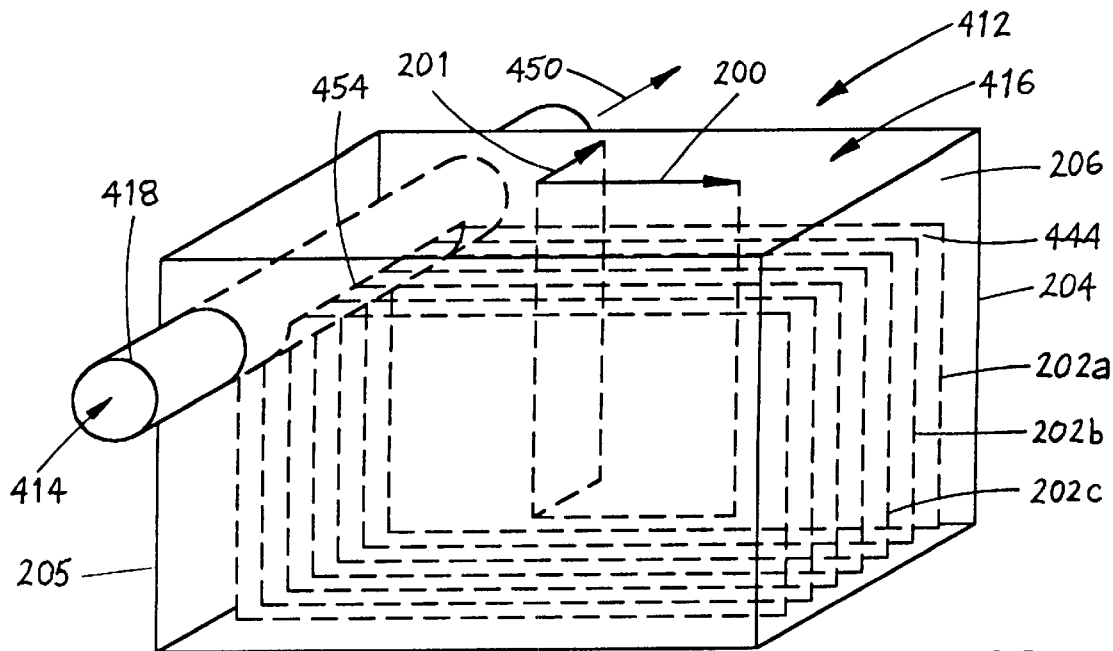
FIGS. 20 and 21 illustrate alternate views of one embodiment of a dispensing system in accordance with the subject invention.

A first embodiment of a particle dispensing system 412 in accordance with the subject invention is illustrated in FIG. 20. A container 204 is provided containing a cell stack 416. The cell stack 416 comprises a plurality of cell cavities 444 separated by cavity walls 202a, 202b, 202c. Each of the cells in the stack is oriented along and within a plane 200. A particle dispenser 418 is provided intermediate the ends 205, 206 of the container. In one implementation, the dispenser has an input 414, a transverse flow output 450, and a parallel flow output 454. In this implementation, the dispenser is oriented in a plane 201 that is substantially perpendicular to the plane 200 of the cell stack. In this implementation, the system is capable of two modes of operation. In the first mode of operation, a transverse flow of particles is passed through the dispenser in a direction substantially parallel to the transverse plane 201 of the dispenser. In the second mode of operation, the particles are emitted from the parallel output 454 in a direction substantially parallel to the plane 200 of the cell cavities, with no more than an insubstantial amount, i.e., no more than 20%, of the particles being emitted from the transverse flow output 450.

Figure 21:
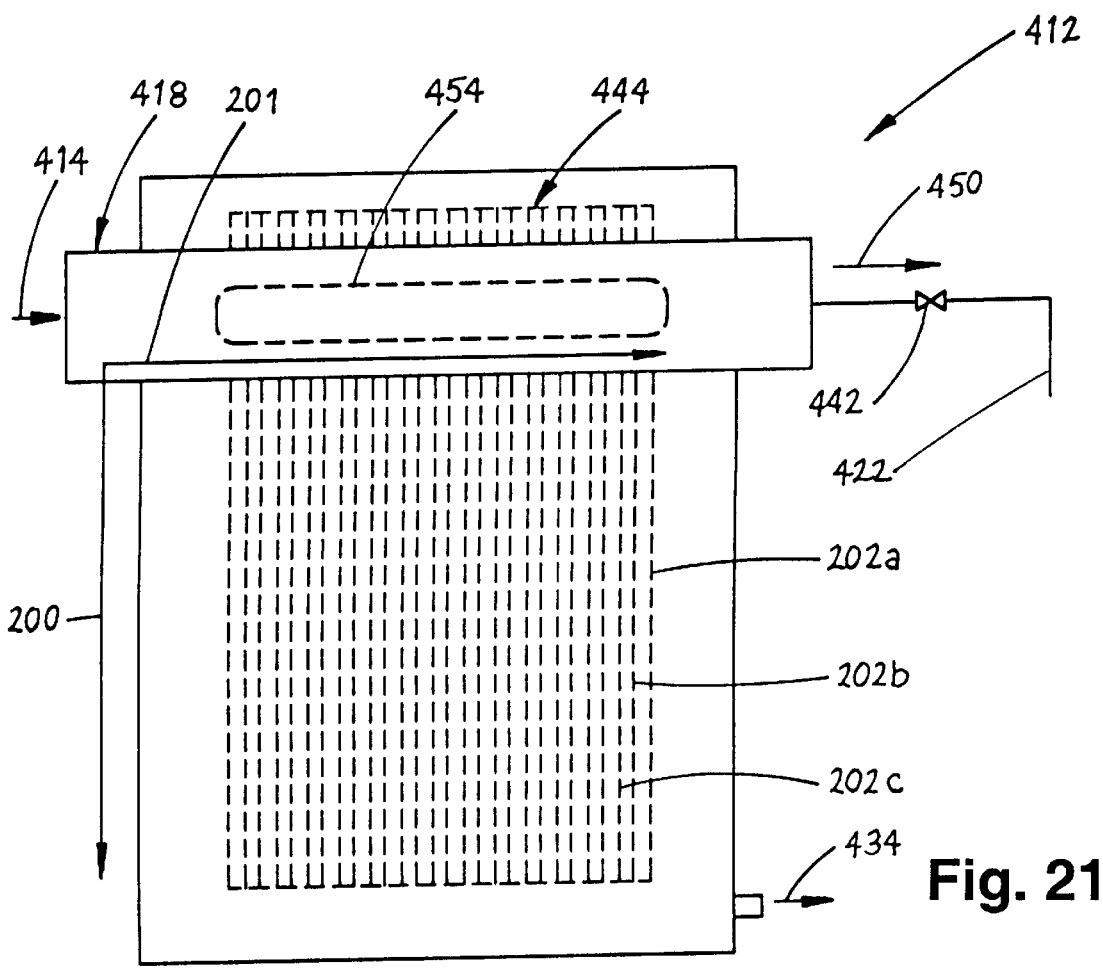

A top view of the system 412 of FIG. 20 is illustrated in FIG. 21, in which, compared to FIG. 20, like elements are referenced with like identifying numerals. As shown in FIG. 21, an exit 434 is provided for allowing a flow medium, whether fluid, gas, or liquid, to exit the container 204. In one implementation, the dispenser 418 is disposed at one end 205 of the container 204 containing the cell stack, and the exit 434 is disposed at the other end 206 of the container 204.

In one implementation, the flow medium is an electrolyte. In this implementation, a piping system 422 and valve 442 are provided at the dispenser output 450. The valve, upon activation thereof, is configured to substantially block transverse flow of electrolyte and particles through the dispenser 418 from the input 414 to the output 450, i.e., so that no more than 20% of the particles flowing into the dispenser are emitted through the transverse output 450.

Figure 22:
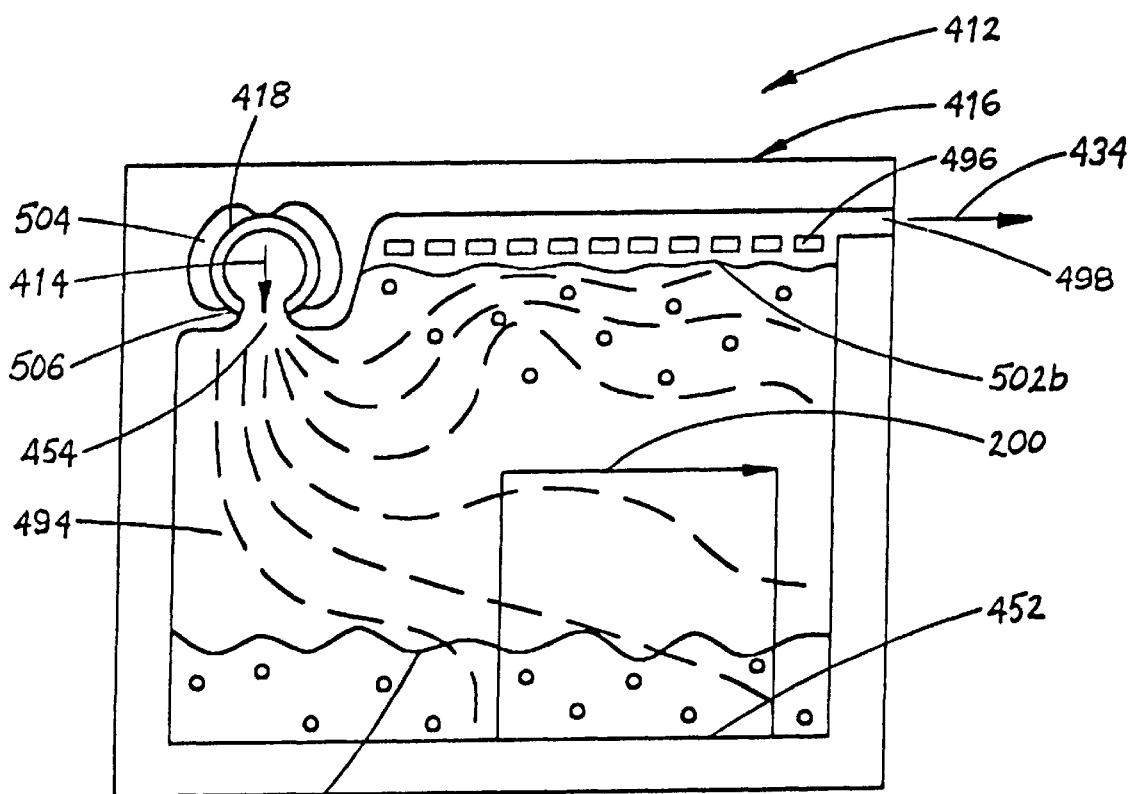
FIGS. 22 and 25 illustrate electrolyte flow in accordance with one embodiment of the subject invention.

In one implementation, illustrated in FIG. 22, the dispenser 418 is situated within a cavity and is rotatable while in contact engagement with a plurality of contact points 506 within the feed tube cavity 504. In this implementation, the dispenser is capable of open and closed positions. In the open position, illustrated in FIG. 22, the dispenser is rotated such that particles are emitted from the parallel flow output 454 of the dispenser 418 and into the cell cavities 444 settling by gravity to the bottom portion 452 of cell stack 416, through a flow path 494 which occurs in the plane 200 of the cells, while no more than an insubstantial amount, i.e., no more than 20%, of the particles are emitted through the transverse output 450 of the dispenser.

Figure 25:
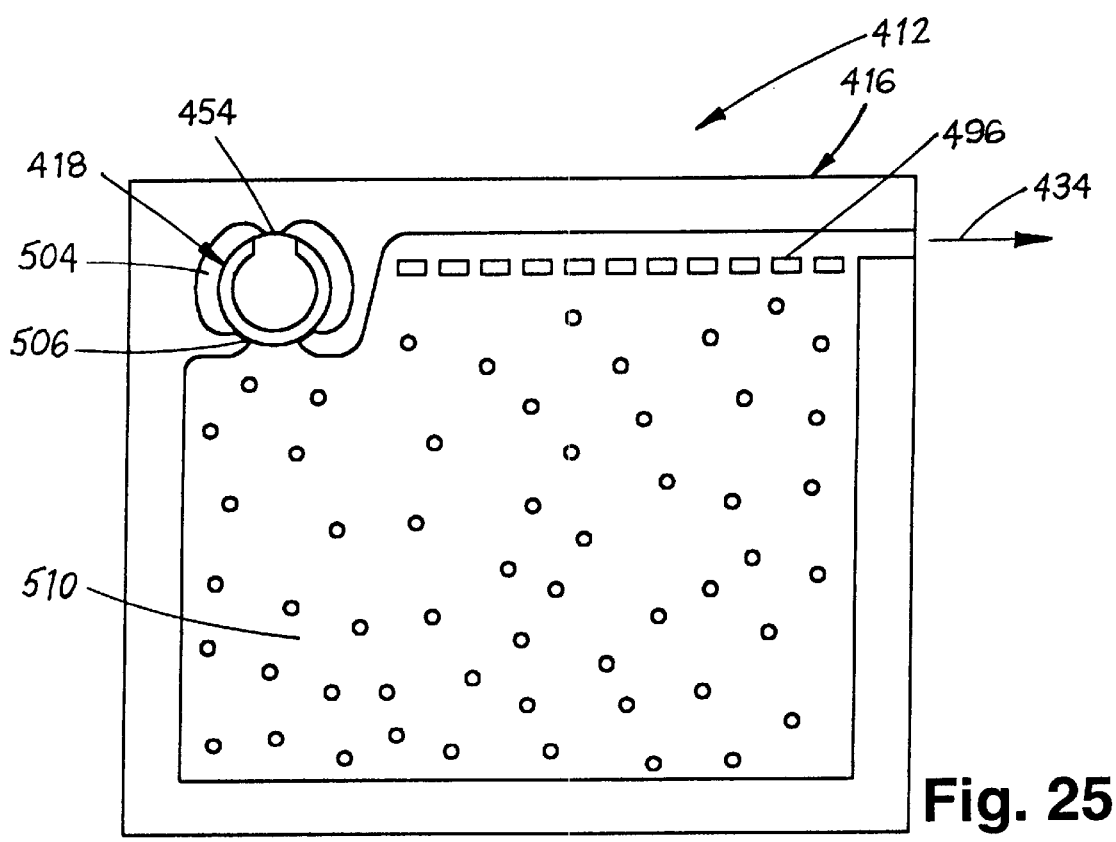

In the closed position, a fully filled cell 510 as illustrated in FIG. 25, the dispenser 418 is rotated such that particles are blocked from passage through the parallel flow opening 454. In this mode of operation, a transverse flow of particles may continue through the dispenser.

Figure 23:
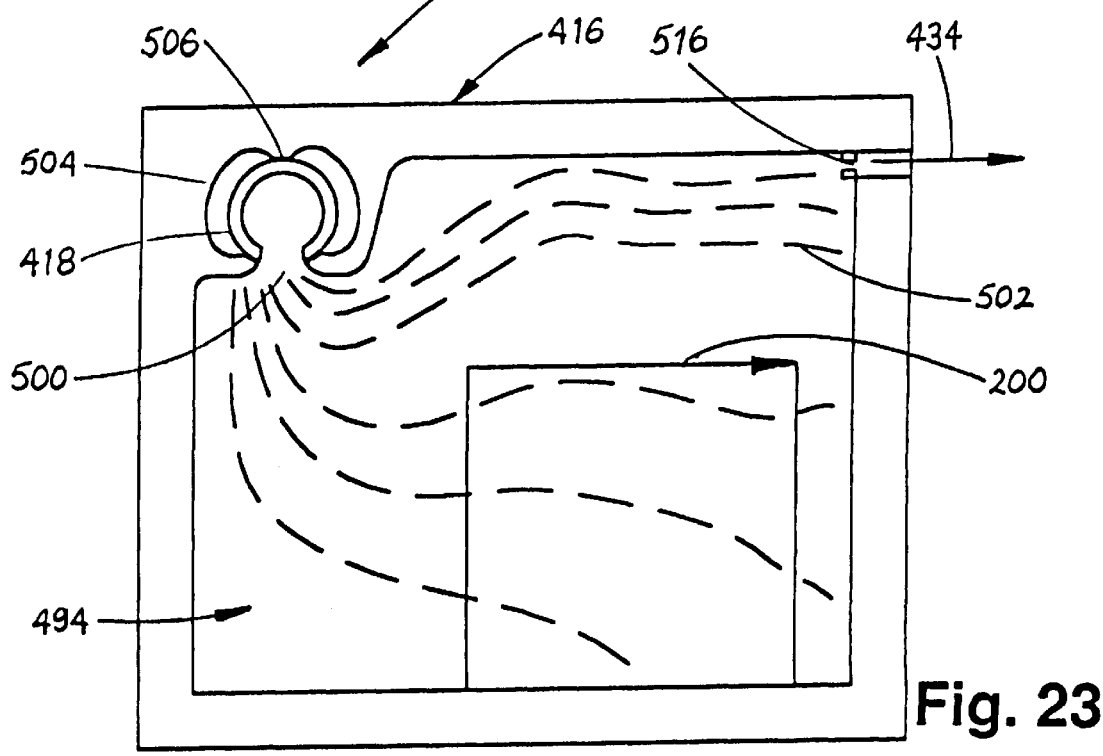
FIG. 23 illustrates electrolyte flow in accordance with a second embodiment of the subject invention.

In one implementation, illustrated in FIGS. 22 and 25, the exit 434 is an electrolyte exit which is formed from a channel 498 leading into the interior of the container 204, and a screen 496 is disposed at the top of the container 204 to prevent particles from exiting the electrolyte exit 434. In this implementation, particles are distributed into the cell cavities through an electrolyte flow within the interior of the container 204 from the parallel flow output 454 of the dispenser 418 to the electrolyte exit 434. FIG. 22 shows an example in which, through action of the electrolyte flow, the particle level within a cavity increases from level 502a to level 502b. In FIGS. 22, 23 and 25, a plurality of contact points 506, between the cell stack 416 and the dispenser 418, are shown.

FIG. 23 shows a second implementation that is identical to the foregoing implementation except that a barrier 516 is provided in lieu of the screen 496 for blocking passage of the particles through the electrolyte exit 434. Parallel flow 500 shown her is analogous to parallel flow 454 shown in FIG. 22 and various flow levels as exemplified by flow level 502 shown in FIG. 23 is analogous to levels 520a and 502b as shown in FIG. 22.

Flow mediums other than an electrolyte are possible. In one implementation, the flow medium is a liquid, such that the particles are deposited through the flow of a liquid. In a second implementation, the flow medium is a gas, such that particles are deposited into the cell cavities through a gas flow. In a third implementation, the flow medium is a fluid, which encompasses either a gas or a liquid. Whatever the flow medium, however, the particles are deposited into the cell cavities through a flow path that extends into the cell cavities in a direction that is substantially parallel to the plane of the cell cavities. The flow by which the particles are deposited can be either hydraulic or pneumatic.

Figure 24:
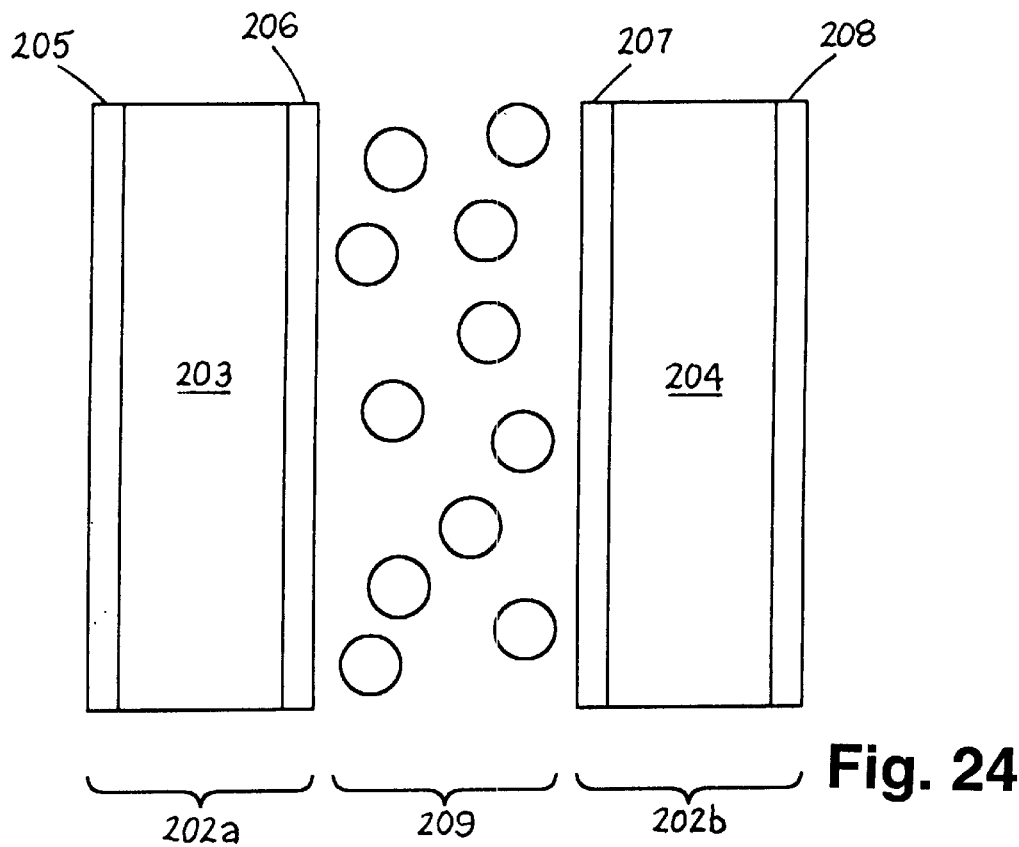
FIG. 24 illustrates one embodiment of cavity wall supports in accordance with the subject invention.

The cavity walls 202a, 202b, 202c, which typically include delicate cathode membranes, are preferably supported so they can withstand the pressure of the flow 494 of the flow medium from the parallel output 454 of the dispenser to the exit 434. In one implementation, illustrated in FIG. 24, a cavity wall is formed by placing a cathode membrane on one side of a metal foam and a thin conducting cell divider plate on the other in a sandwich arrangement. The metal foam provides support to the cavity walls. Thus, in FIG. 24, cathode membrane 207 and conducting divider plate 208 are placed on either side of and supported by metal foam 204, and cathode membrane 205 and conducting divider plate 206 are placed on either side of and supported by metal foam 203. The cavity walls are spaced from another to form a cell cavity 209 containing fuel particles. In one implementation, the metal foam is a nickel foam. With reference to FIG. 22, by distributing fuel particles into the cell cavities through a flow into the cell cavities and substantially parallel to the plane 200 of the cell cavities, a more uniform distribution and complete filling of fuel particles within the cell cavities is achieved in relation to the prior art. The mounding and clogging which characterizes conventional systems is thus avoided.

Figure 26:
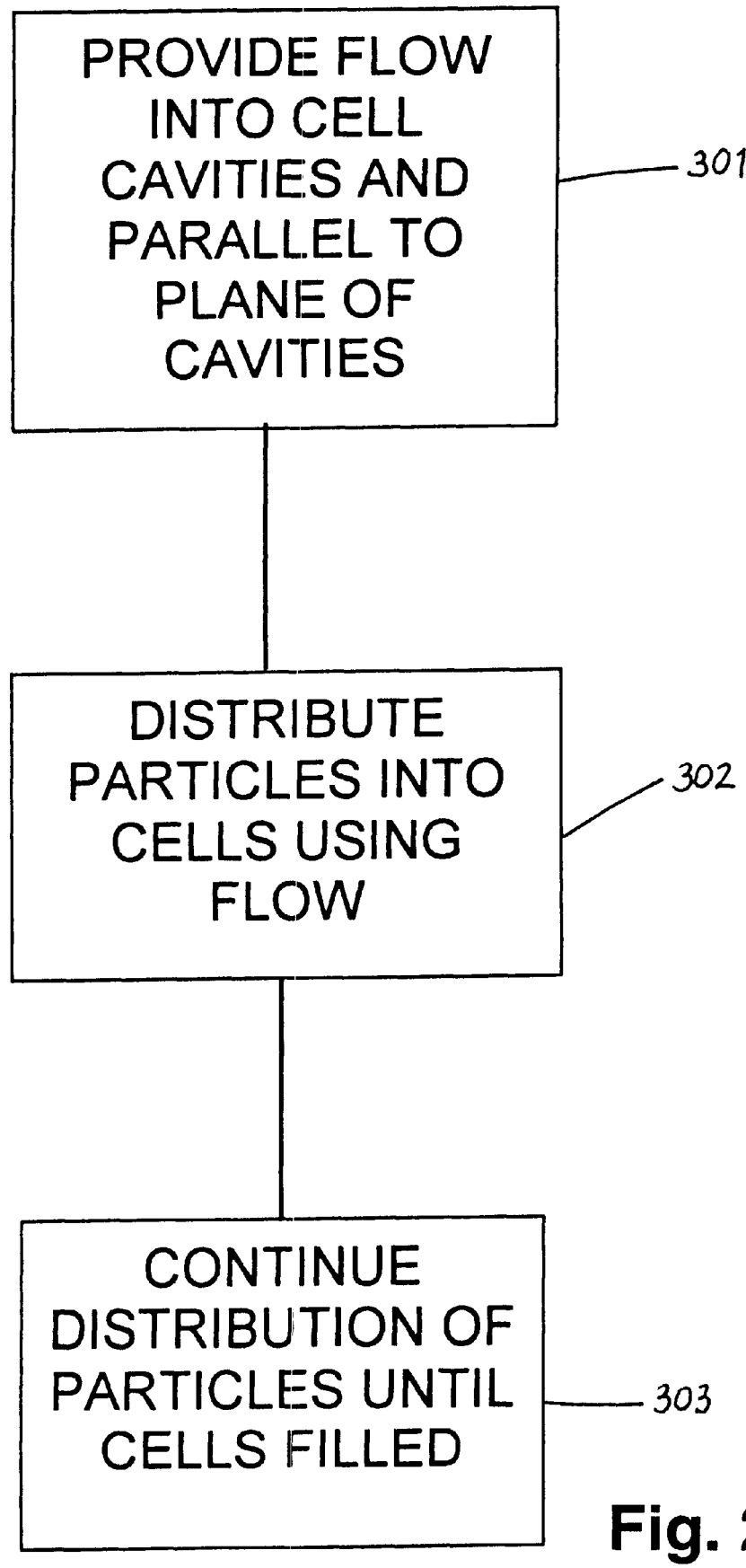
FIG. 26 is a flowchart illustrating one embodiment of a method of operation in accordance with the subject invention.

FIG. 26 illustrates one embodiment of a method of operation in accordance with the subject invention. In step 301, a flow is provided into the cell cavities in a direction substantially parallel to the plane of the cells. In one implementation, the flow is as depicted in FIGS. 22 and 23, that is, from the parallel output 454 of the dispenser to the exit 434. In one implementation example, the flow is a flow of a mixture of particles and a flow medium, whether gas, liquid, or fluid. In another implementation example, the flow is hydraulic. In yet another implementation example, the flow is pneumatic. In step 302, particles are distributed into the cell cavities through the action of the flow. As indicated in step 303, step 302 is continued until an operative number of cells are substantially filled with particles.

Figure 1:
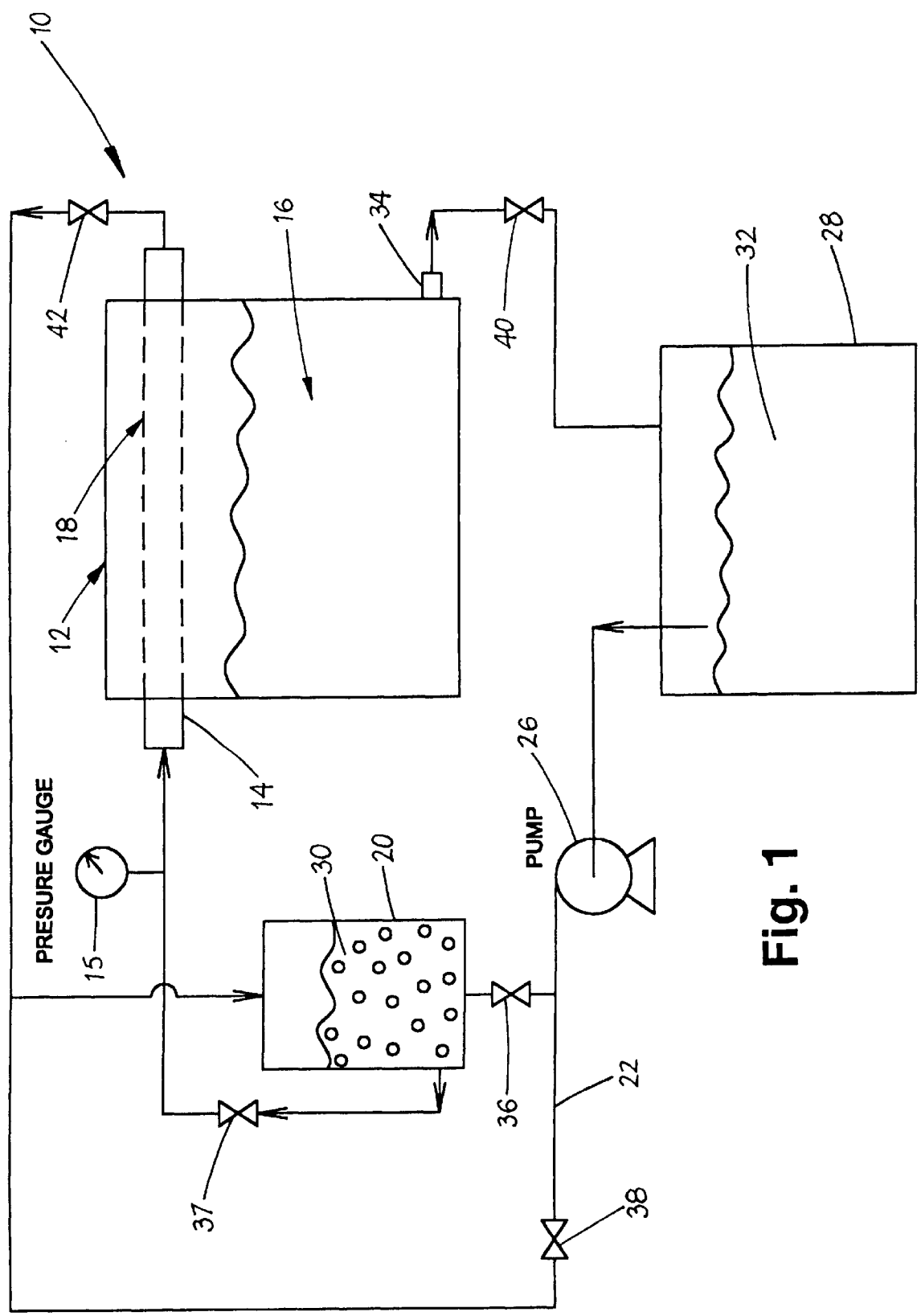
FIG. 1 is a system line diagram specifically illustrating the flow path of an overall fuel particle feed system of the present invention.

Referring to FIG. 1, a system line diagram is shown specifically illustrating the flow path of an overall fuel particle feed system 10 of a preferred embodiment of the present invention. The feed system 10 includes a fuel particle feed mechanism 12 for a zinc/air fuel cell. The fuel particle feed mechanism 12, further comprises an input 14 of electrolyte and fuel particles feeding into a fuel cell 16 through a novel feed tube 18. Means are provided for the input 14 of electrolyte and fuel particles. Means are also provided for refueling the fuel cell stack 16 located below the fuel particle feeding mechanism 12. The entire system 10 can be co-housed with the cell stack 16 and feed mechanism 12, or the cell stack 16 and feed mechanism 12 can be separate from the balance of the system.

Additionally, and more specifically, the feed system 10 comprises a fluidized bed 20 of electrolyte and fuel particles or other means of fuel particle storage, a connective piping subsystem 22, a plurality of valves 36, 37, 38, 40 and 42, a pump 26, and an electrolyte reservoir 28. The fluidized bed 20 is connected to the connective piping subsystem 22 through the plurality of valves 36, 37, 38, 40 and 42. The pump 26 provides the driving force at the beginning of the refueling to fluidize the fluidized bed 20 and move electrolyte and fuel particles 30 from the fluidized bed 20 into the fuel particle feed mechanism 12 and returns electrolyte 32 through an electrolyte exit 34 to the electrolyte reservoir 28 to begin another refueling when needed. The plurality of valves 36, 37, 38, 40 and 42 open or close the feed system 10 when necessary, while the electrolyte reservoir 28 provides the electrolyte 32 to the feed system 10. The fluidized bed 20 provides the fuel of electrolyte and fuel particles 30 to refuel the fuel particle feed mechanism 12.

The plurality of valves comprises a first valve 36, a second valve 38, a third valve 37, a fourth valve 40, and a fifth valve 42. The first valve 36 is located between the fluidized bed 20 and the pump 26. The second valve 38 is located between the pump 26 and the feed tube 18. The third valve 37 is located between the fluidized bed 20 and the feed tube 14, while the fourth valve 40 is located after the fuel cell and before electrolyte reservoir. The fifth valve 42 is located after the fuel cell and before the fluidized bed 20.

The refueling operation will be described below. A pressure sensing device, shown here as a pressure gauge 15 is positioned between valve 37 and feed tube 14.

Figure 2:
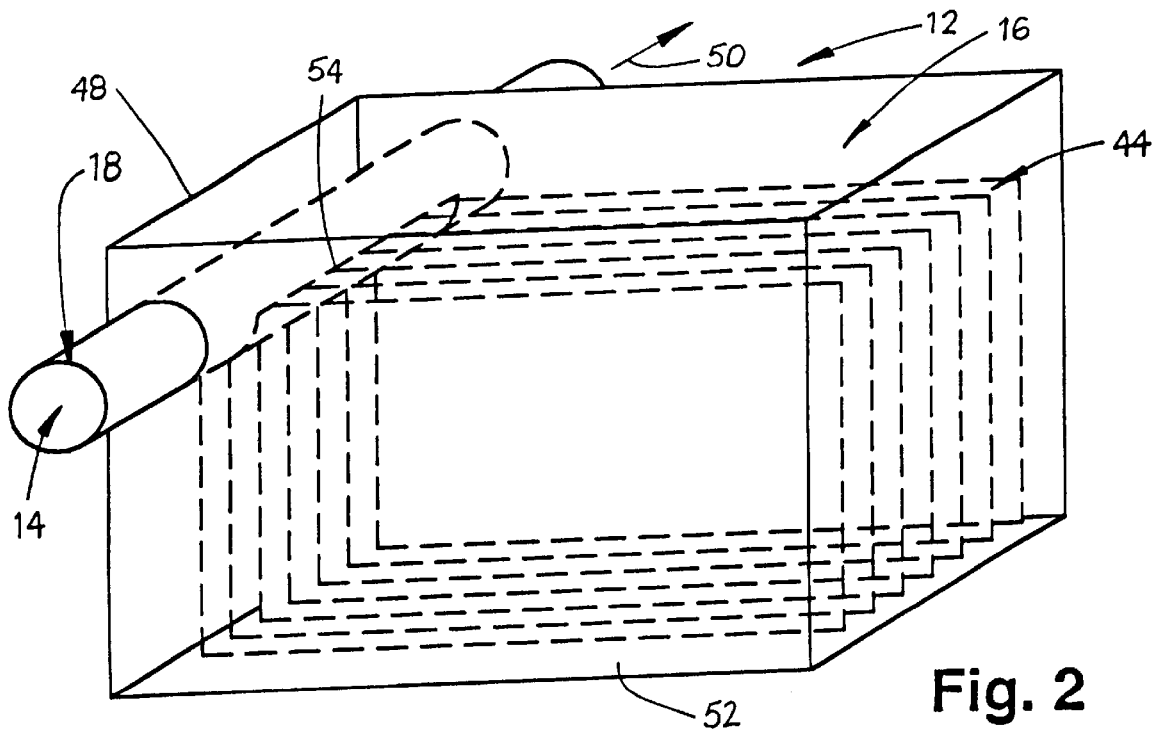
FIG. 2 is a partial perspective view of the present invention illustrating a representative feed tube for fluid and fuel particle input to individual cells within a fuel cell stack.

Referring now to FIG. 2, a partial perspective view of one embodiment of the present invention is shown illustrating the representative feed tube 18 for the input 14 of electrolyte and fuel particles to individual cell cavities 44 within the fuel cell 16. The means for refueling the fuel cell 16 is the feed tube 18 movably located in one embodiment in a fuel cell top portion 46 and also in a fuel cell side portion 48 of the fuel cell 16. Also shown in FIG. 2 is a feed tube output 50 from which unused or excess electrolyte and fuel particles 30 may exit following the refueling operation. The feed tube 18 is preferably a circular cylinder, but it should be understood that it can be constructed in many other shapes and forms. The typical cell cavities 44 of a zinc/air battery are in contact with the feed tube 18 as well as a fuel cell bottom 52 in each fuel cell stack 16.

More specifically, as shown in FIG. 2, the cell cavities 44 are in physical contact with, and aligned at virtual right angles to, a feed tube cutout 54 in the feed tube 18. This cutout 54 feature is novel compared to the known prior art. The purpose of the cutout 54, to be elaborated upon below, is to ensure immediate communication to each cell cavity 44 to ensure quicker refueling, plus isolation from each of the cell cavities 44 to prevent shorting between cavities 44 when the cell stack is not being refueled. The cutout 54 is of such length and arc to exactly cover the number of said individual fuel cell cavities 44, when in the closed position, in the fuel cell 16, thereby providing isolation from each of the individual fuel cell cavities 44 to prevent shorting between the individual cells 44 during fuel cell discharge and to further provide immediate and quick refueling of the individual cell cavities 44.

Figure 3:
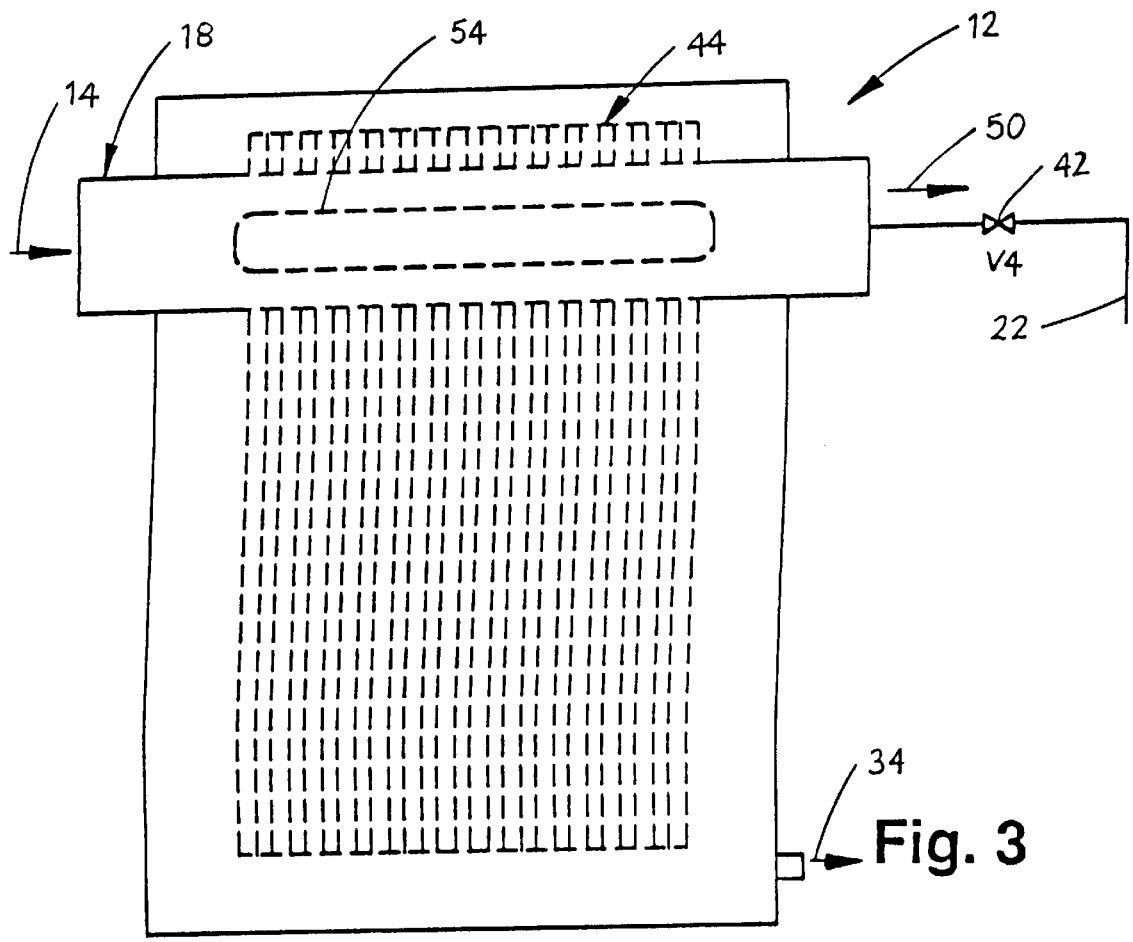
FIG. 3 is a partial schematic plan view of the feed tube for fluid and fuel particle input to the individual cells within the fuel cell stack.

Referring next to FIG. 3, a partial schematic plan view is shown of one embodiment of the feed tube 18 for the input 14 of electrolyte and fuel particles to the individual cell cavities 44 within the fuel cell 16 for the preferred embodiment. Shown from a different perspective is the feed tube cutout 54, illustrating how the cutout 54 extends across the top of all cell cavities 44.

Figure 4:
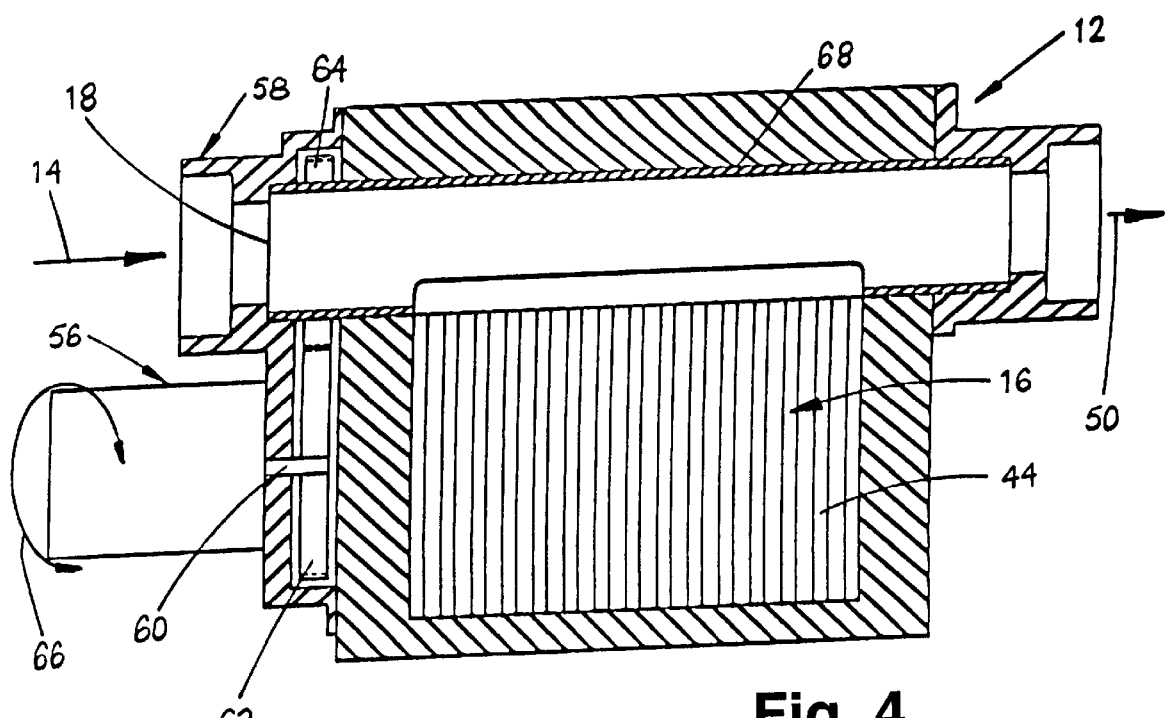
FIG. 4 is a schematic side section view of the fuel cell, feed tube and feed tube drive motor.

Now referring to FIG. 4, a schematic side section view is shown of one embodiment of the fuel cell 16, feed tube 18 and a feed tube drive motor 56. In this 10 embodiment, the means for operating the feed tube 18 is the motor 56, but any other means such as a lever or helical thrust mechanism may be used. A power source and appropriate connections to the motor 56 are known in the art and, therefore, not shown or described. The motor 56 has a central drive axle 60 and is mounted at the input 14 of the feed mechanism 12 in a motor holder and fitting 58. The motor could also be positioned at the output or otherwise. The motor holder and fitting 58 is further integrally affixed to the fuel cell 16. The motor 56 is also located preferably underneath the feed tube 18. The motor 56 rotates as shown by arrow 66.

The cost of the motor 56 is low since the power requirements are minimal to rotate the feed tube 18 a short distance of an arc to either an open or a closed position to permit electrolyte and fuel particles 30 to flow into the cell cavities 44. The feed tube 18 can rotate about its center to locate the cutout 54 (not shown) in front of each cell cavity 44. Each cell 44 has an entrance for fuel particles and electrolyte and an exit for electrolyte (not shown here but illustrated below in subsequent FIGS.). The entrance and the exit create a liquid flow that moves the fuel particles inside of each cell cavity 44 arranging them in a way that fills to the necessary level, in an even fashion, with no piling up of fuel particles, and no clogging of fuel particles.

Figure 5:
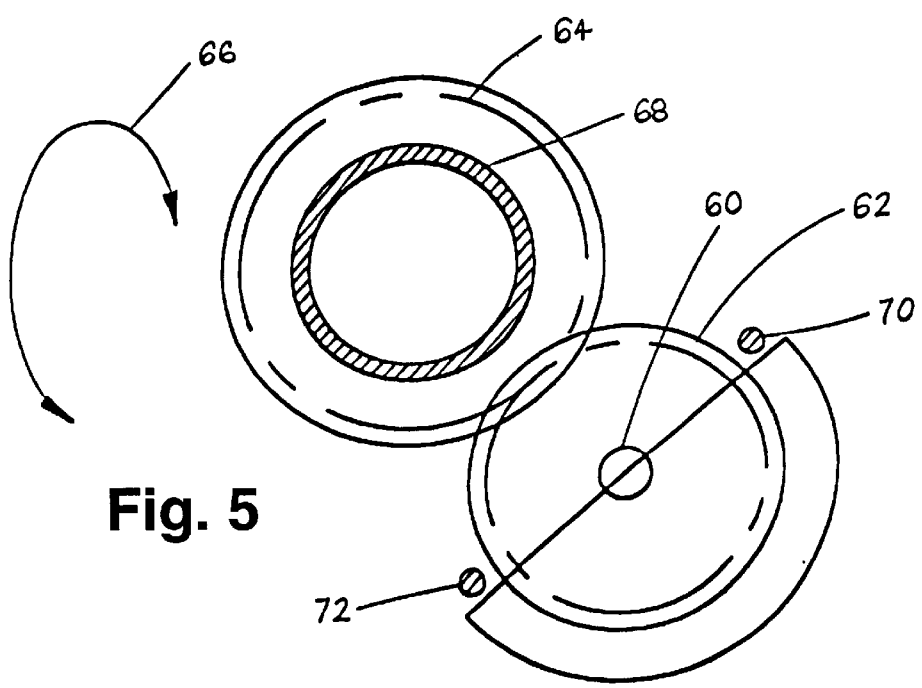
FIG. 5 is an enlarged partial end section view of gear mechanisms for the feed tube drive motor.

Referring now to FIG. 5, an enlarged partial end section view is shown of one embodiment of the gear mechanisms for the feed tube drive motor 56. Located within a motor holder and fitting component 58, the motor gear 62 comprises a central drive axle 60, two motor gear stops 70 and 72 which constrain movement of the motor gear 62 and the feed tube gear 64 so that the rotation (shown be rotational arrow 66) of the feed tube outer wall 68 is sufficient to open and close the feed tube 18 over each of the fuel cell cavities 44 to allow immediate and quick refueling.

Figure 6:
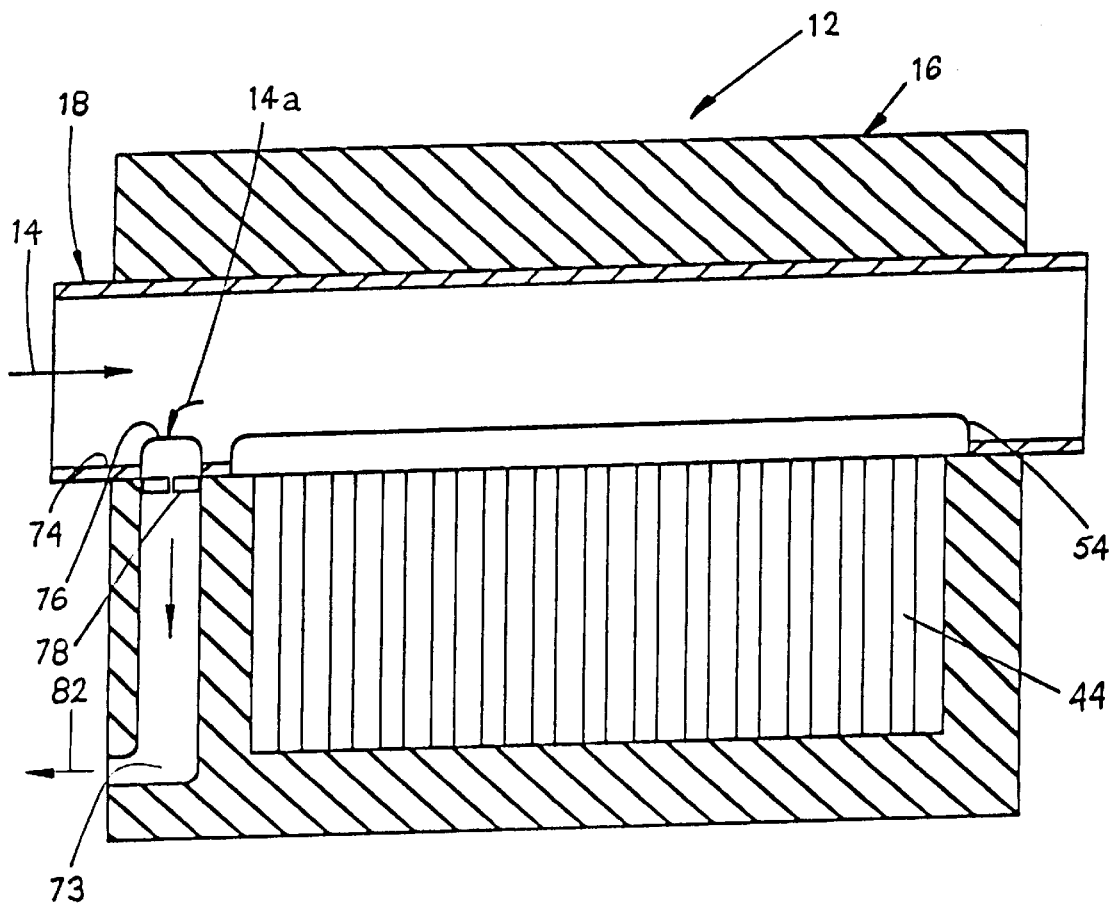
FIG. 6 is a schematic partial side section view of the fuel cell specifically illustrating a by-pass for electrolyte.

Referring next to FIG. 6, a schematic partial side section view is shown of one embodiment of the fuel cell 16 specifically illustrating a fuel cell electrolyte bypass channel 73. The bypass channel 73 is located near the input 14 of the feed mechanism 12 and is in fluid communication with slot 76 in the lower portion 74 of feed tube 18 through an inner bypass screened opening 78, and a cutout section 76 of the feed tube 18. In this way, the bypass channel 73 is open to the input 14 of electrolyte and fuel particles in the feed tube 18. The bypass channel 73 is filtered by a bypass screen 78 of such mesh size to allow excess electrolyte (and not fuel particles), herein illustrated as an electrolyte bypass output flow arrow 14a and bypass output arrow 82, to pass through and out of the fuel cell 16, thereby returning the electrolyte to the electrolyte reservoir 28 for reuse.

The electrolyte bypass channel 73 is needed under conditions of over pressure and reduced flow rate in the feed tube 18 near the end of the particle fueling operation when the cells closest to the electrolyte input 14 need to be filled. With the bypass channel 73, over pressure is relieved, thereby maintaining a high electrolyte and particle flow-rate upstream of the bypass channel. In other words, the bypass channel 73 ensures that the cell cavities 44 are filled during refueling. Internal pressure is kept low to prevent the fluid flow of electrolyte from stopping and therefore leaving unfilled areas within the cell cavities 44. This novel bypass feature overcomes the problem of incomplete filling of the one or two cell cavities closest to the feed tube inlet, and enables even filling of fuel particles with no fuel particle pile up or fuel particle clogging.

Figure 7:
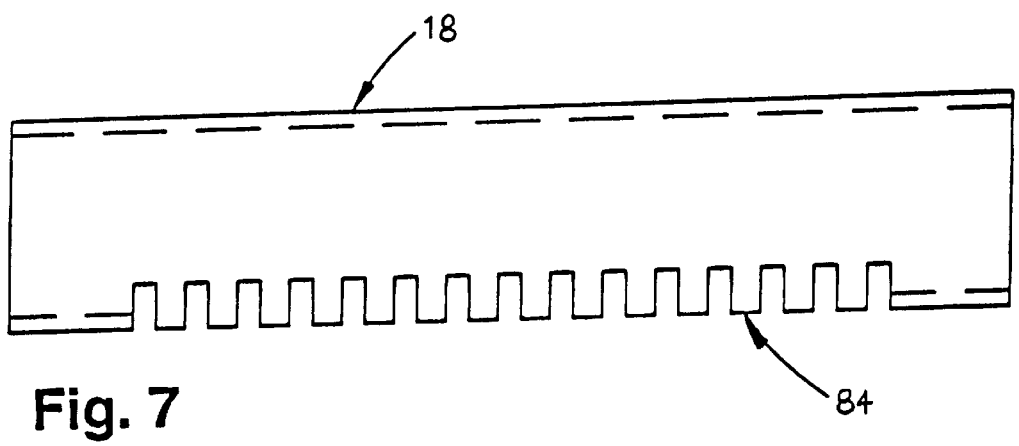
FIG. 7 is a schematic partial side view of a second embodiment of a feed tube cutout.

Now referring to FIG. 7, a schematic partial side view of a second embodiment of a novel feed tube cutout 54 is shown. This second embodiment comprises a plurality of notch cutouts 84 to be more fully explained in subsequent FIGS. 8, 11 and 12.

Referring now to FIG. 8, a schematic partial side section view of the notched feed tube is shown illustrating axial movement 86 of the feed tube 18, in addition to a plurality of seals 88 in the feed tube 18. The feed tube 18 may, in this other embodiment of feed tube operation, rotate as in the previous embodiment or move axially across the top of the fuel cell 16 to refuel the individual fuel cell cavities 44. The feed tube 18 is comprised of the plurality of notched cutouts 84 in the lower portion 74 of the feed tube 18, wherein the cutouts 84 are located to match the distance between said individual fuel cell cavities 44, thereby allowing immediate and quick refueling of said cell cavities 44. As the feed tube 18 is moved axially, the plurality of cutouts 84 open or close the individual fuel cell cavities 44, thereby isolating each of the cavities 44 and thereby also preventing shorting between said cell cavities 44 during fuel cell discharge. Other views of this novel feature will be shown in FIGS. 11 and 12.

The plurality of seals 88, shown in FIG. 8, are located at distal ends of the feed tube 18, between the feed tube 18 and upper portions 90 of the fuel cell body, thereby improving the sealing capability of the feed mechanism 12 to prevent leaks of electrolyte and fuel particles 30. These seals 88 may be comprised of common O-rings as is typically used in various fluid sealing applications, or other common seal components. Referring next to FIG. 9, a schematic partial side section view is shown of one embodiment of the feed tube 18 illustrating a coated feed tube. A novel and pliable coating 92 on the outer wall 68 of the feed tube 18 ensures a virtually perfect fit between the feed tube 18 and the individual cell cavities 44, thereby ensuring isolation between the cell cavities 44, and thereby further ensuring no short circuiting will occur between the individual cell cavities 44. The coating 92 may be one of several types of pliable coating, such as rubber EPDM, Buna rubber, Nytrile(®, or others of similar pliability.

Now referring to FIG. 10, a partial section end view of one embodiment of the feed tube is shown, illustrating the feed tube coating 92 surrounding the feed tube 18 on its outer wall 68.

Referring now to FIG. 11, an enlarged schematic partial side view is shown of an alternative embodiment for axial feed tube operation illustrating the open position of the feed tube 18, and the plurality of notched cutouts 84. In this FIG. 11, the plurality of notched cutouts 84 line up on the individual cell cavities 44 allowing quick refueling and partial isolation from adjoining cell cavities 44.

Referring next to FIG. 12, an enlarged schematic partial side view is shown of an alternative embodiment for axial feed tube operation illustrating the closed position of the feed tube, and the plurality of notched cutouts 84. In this FIG. 12, the plurality of notched cutouts 84 block the individual cell cavities 44 preventing further refueling and maintaining complete isolation from adjoining cell cavities 44, thereby preventing short circuiting of the battery during current discharge.

Figure 13:
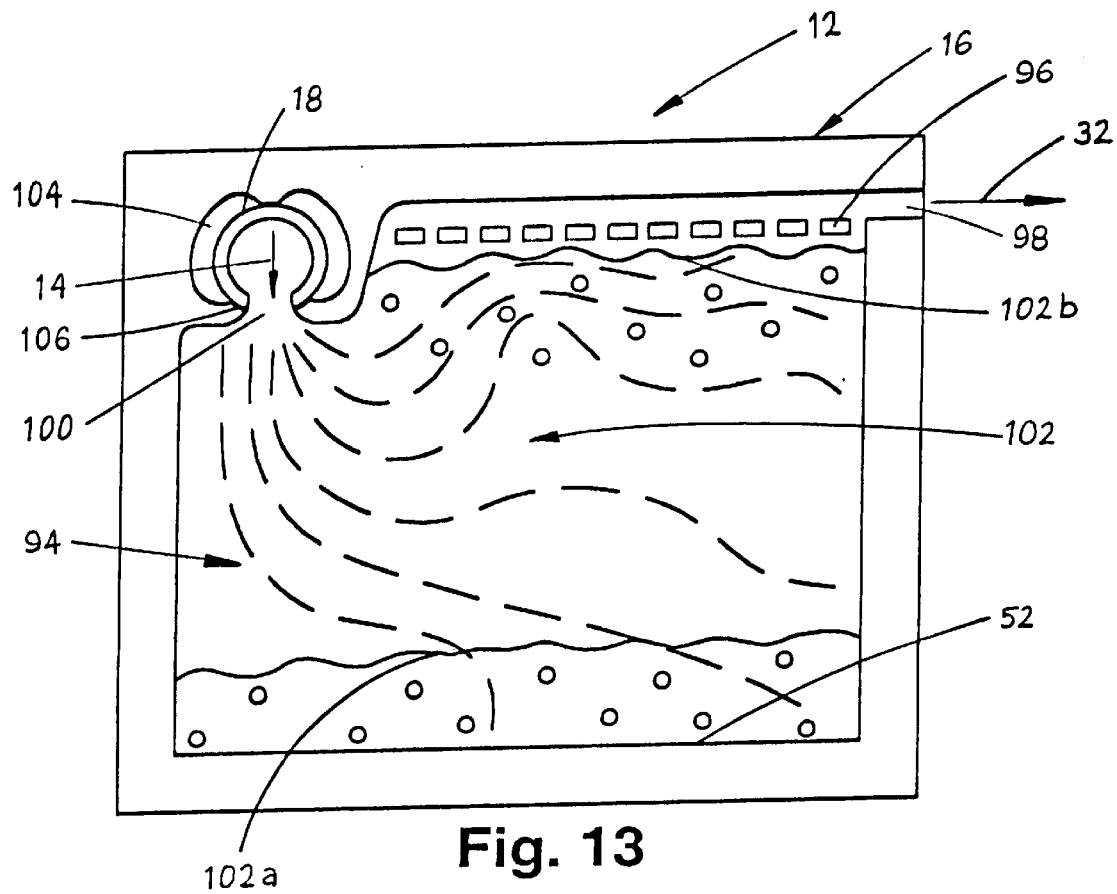
FIG. 13 is a schematic end view of a representative refueling operation with rotational feed tube operation in the open position, and illustrating a second embodiment for optimized fuel particle flow.

Now referring to FIG. 13, a schematic end view of a representative refueling operation in a single cell is shown with rotational feed tube operation, and illustrating an embodiment for optimized fuel particle flow as is illustrated by fuel particle flow lines 94. In this embodiment for optimized fuel particle flow, the fuel cell 16 comprises a screen 96 at the top portion 46 of the fuel cell 16. The screen 96 is comprised of a plurality of holes of sufficient diameter to allow electrolyte 32 to pass through as refueling is completed, yet also of sufficient diameter to prevent the fuel particle flow 94 passing into the individual cell cavities 44 from passing through the screen 96. In addition, the electrolyte 32 returns to the electrolyte reservoir 28. The screen 96 is preferably located near the top of the cell cavity. Therefore, the electrolyte 32 will pass through a narrow channel 98 located near the top portion of the cell cavity. In this FIG. 13, the feed tube 18 is shown in the open position 100 with the input of electrolyte and fuel particles 14 as shown by a directional arrow.

Additionally, in FIG. 13, is seen a generalized fuel particle filling pattern 102 as exemplified by a fuel particle level 102a filling the fuel cell 16 from the bottom 52 to a fuel particle level 102b to the screen 96 at the top of the feed tube 18. The location of the screen 96 across the top is appropriate when a low hydraulic impedance exit area is needed to balance the electrolyte flow up through the bed of zinc particles during fuel cell discharge. Openings in the screen 96 need to be balanced so that not too much electrolyte passes through the screen during cell fueling before moving the flow of fuel particles 94 to completely fill the fuel cell 16.

Also, shown in FIG. 13, is the feed tube 18 illustrated clearly within a feed tube cavity 104. The feed tube cavity 104 is of such shape to be in direct contact with the feed tube 18 at three contact points 106 (more clearly illustrated in FIGS. 18 and 19), rather than in continuous contact about the circumference of the feed tube 18. Therefore, the feed tube 18 may rotate into the open position 100 without requiring high rotational force to fill the cell cavities 44 in the fuel cell 16.

Figure 14:
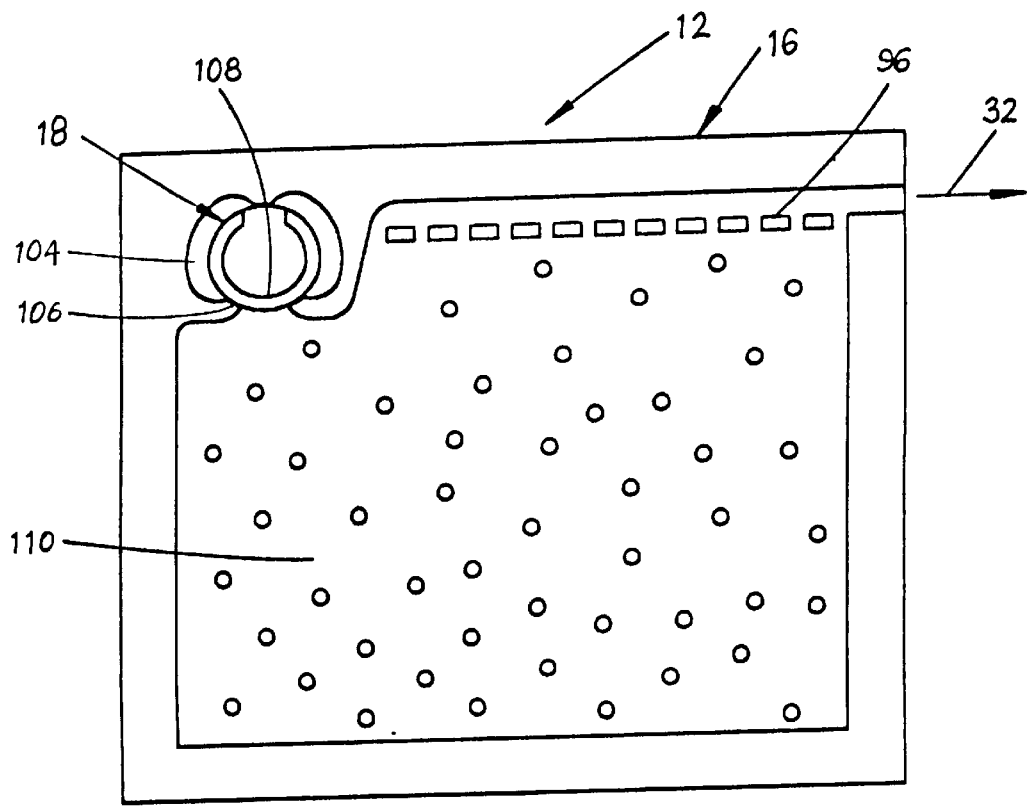
FIG. 14 is a schematic end view of a completed refueling operation illustrating the rotational feed tube in operation in the closed position.

Referring now to FIG. 14, a schematic end view of one embodiment of a completed refueling operation is shown with rotational feed tube operation. Whereas the previous FIG. 13 illustrated the open position 100 of the feed tube 18, FIG. 14 shows a closed position 108 because the fuel cell 16 is now a fully filled cell 110, and is operational for current discharge.

Figure 15:
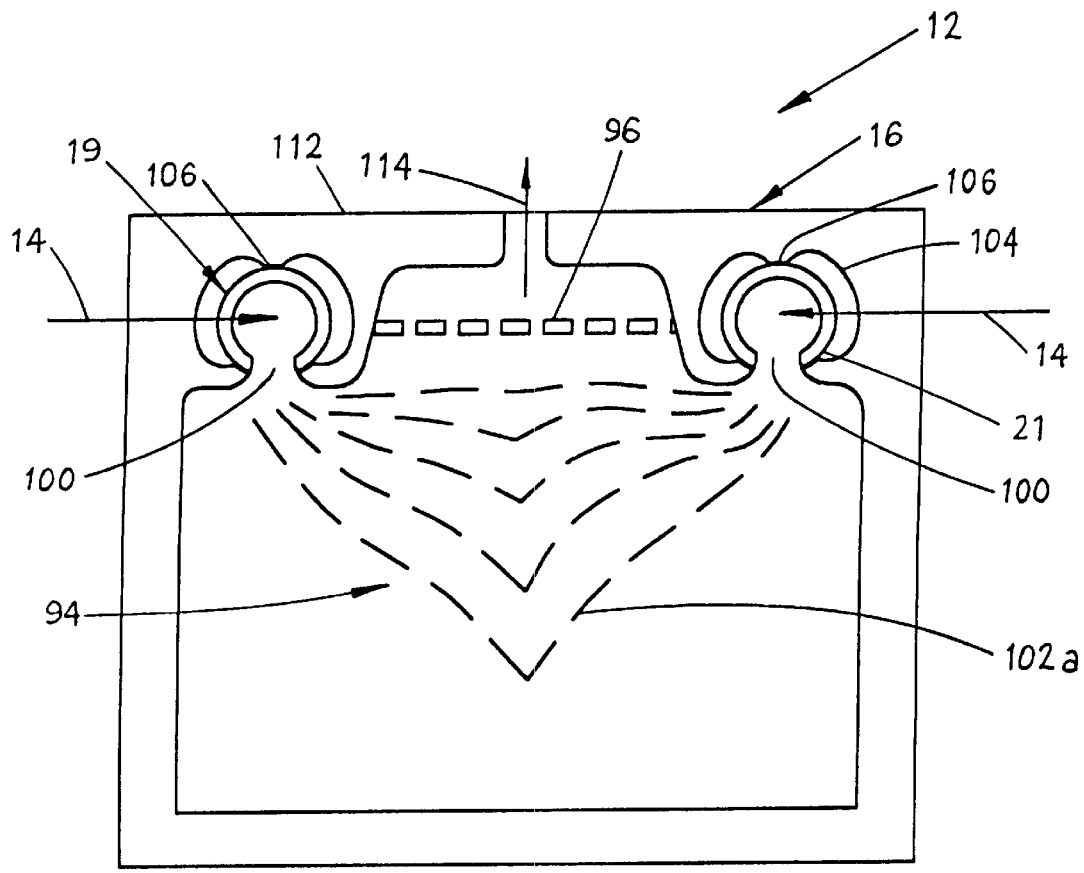
FIG. 15 is a schematic end view illustrating an alternative embodiment using multiple feed tubes.

Referring next to FIG. 15, a schematic end view illustrating an alternative embodiment is shown using multiple feed tubes 19 and 21. Alternate means for refueling the fuel cell 16 comprises preferably two feed tubes 19 and 21 located at opposite ends of a center top portion 112 of the fuel cell 16. The purpose of two or more tubes 19 and 21 is to increase the speed of filling the fuel cell 16. An electrolyte output 114 is located at the center of top portion 112 of the fuel cell 16.

Figure 16:
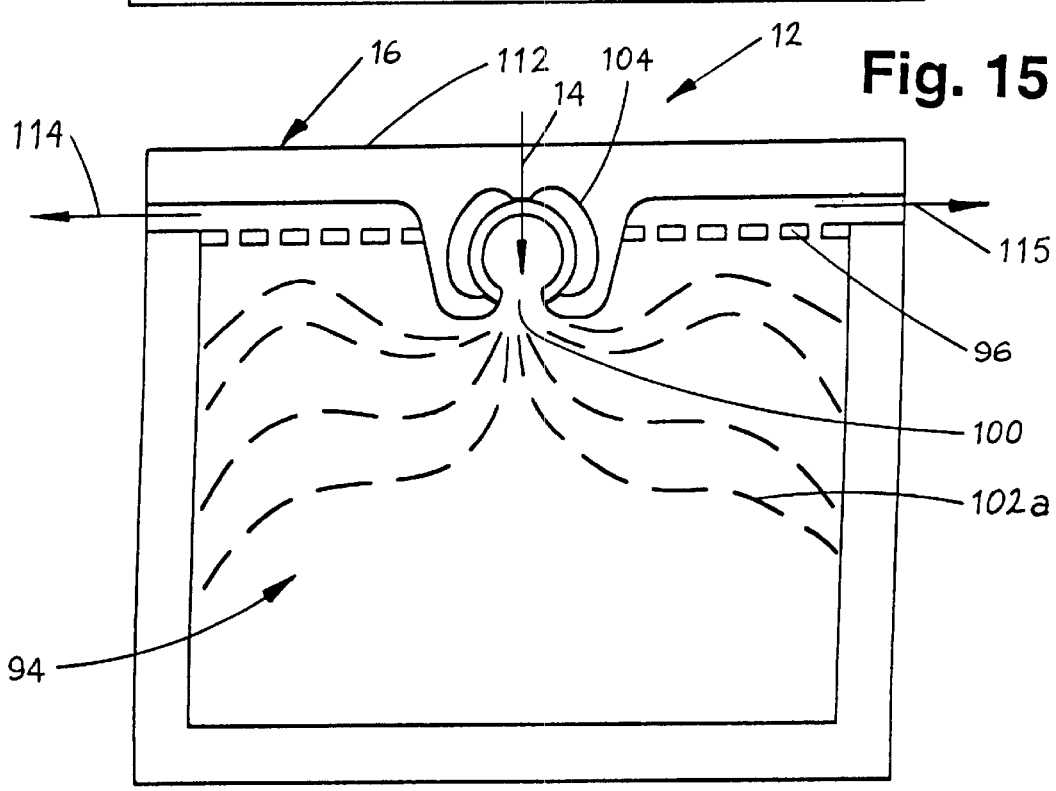
FIG. 16 is a schematic end view illustrating an alternative central location embodiment of the feed tube showing multiple electrolyte exits.

Now referring to FIG. 16, a schematic end view illustrating an alternative central location embodiment is shown of the feed tube 18. Alternate means for refueling the fuel cell 16 comprises a feed tube 18 in the center top portion 112 of the fuel cell 16. With this position of the feed tube 18, two electrolyte outputs 114 and 115 are possible, as shown.

Referring next to FIG. 17, a schematic end view of the fuel cell 16 illustrating another embodiment for optimized fuel particle flow as illustrated by fuel particle flow lines 94, is shown. Specifically, a small screen 116 located at the far side portion 48 of the fuel cell 16 is used to cover the electrolyte output 114. The purpose of this small screen 116 is to move fuel particles more rapidly toward the exit so that the top of the cell is filled more rapidly with particles.

Now referring to FIG. 18, an enlarged schematic partial cutaway end view of one embodiment is shown with three contact points 106 on the feed tube 18 in the feed tube cavity 104. This FIG. 18 is an enlarged portion of the tube cavity 104 as previously described in FIG. 13.

Referring finally to FIG. 19, an enlarged schematic partial cutaway end view of a second embodiment of the feed tube cavity 104 is shown. The feed tube 18 in this embodiment has five contact points 107, rather than in continuous contact about the circumference of said feed tube 18, thereby ensuring that the feed tube 18 rotates into open 100 and closed position 108 without requiring high rotational force. Obviously, more contact points are possible and contemplated herein, but the fewer the contact points the less friction on the rotatable feed tubes, and thus, less energy is required to rotate said feed tubes from the open to closed, and closed to open positions during operation. The preferred embodiment includes three contact points.

Fuel Cell Refueling Operation

One embodiment of the fuel cell refueling operation can be concisely summarized in five steps. The first step is cleaning the feed tube 18 by flowing electrolyte through it, and the second step is rotating the feed tube 18. The third step is feeding the fuel particles entrained in the electrolyte 32 into the fuel cell 16. The fourth step is cleaning the feed tube by flowing electrolyte through it. The fifth step is rotating the feed tube 18 to the closed position 108 to isolate the individual cell cavities 44 from each other to prevent shorting.

The following is a listing of detailed steps providing amplified information of one embodiment of the refueling operation:

1. The feed tube 18 is connected at one end to the piping subsystem 22 that brings the fuel particles, and at the feed tube output 50 to the piping subsystem 22 that takes the fuel particles back to their origin.

2. Valves 38 is opened and valves 36 and 37 are closed and electrolyte 32 is pumped into the feed tube 18 to clear any particles out of the rotation path of the feed tube 18.

3. The exit valve 42 is then closed.

4. The feed tube 18 is rotated to locate the cutouts 54 in front of the cell cavities 44.

5. Valves 36 and 37 are opened and valve 38 is closed and fuel particles are then fed into the feed tube 18. Since the exit valve 42 of the feed tube 18 is closed, the fuel particles move with the electrolyte 32 into the cavities 44. Generally the first cavity to be filled is the one closest to the exit side. When the first of the cavities 44 is full, the electrolyte flow gets significantly redirected into the second cavity from the exit and the fuel particles move into this second of the cavities 44, and this process is repeated until all cell cavities 44 are filled.

The fuel particles move with electrolyte flow. If there is one exit hole for the electrolyte 32 inside of a cell cavity 44, the flow will take that direction. Fuel particles are pushed and carried in that direction and, since they are heavier than the electrolyte 32, eventually go to the bottom 52 of the fuel cell 16. The electrolyte 32 continues its movement toward the electrolyte outputs 114 moving the fuel particles with it. If there are more than one output 114 for the electrolyte 32 inside the cavities 44, the fuel particles will move to the different outputs 114. Every time a cavity 44 is full, fuel particles accumulate in the portion of the feed tube 18 directly adjacent to that cavity. The input pressure rises significantly after all the cell cavities are filled due to many fuel particles inside of the feed tube 18, giving an indication to shut off the fuel particle flow. Another way of knowing when to shut off the fuel particle flow 94 is by detecting the amount of metal inside of the feed tube 18 by optical or other means.

6. After the fuel particle flow 94 is shut off, the output 50 of the feed tube 18 (valve 42) is opened and electrolyte 32 without fuel particles is pumped through the feed tube 18. This electrolyte 32 carries the fuel particles left in the feed tube 18 back to their origin. The electrolyte 32 cleans the feed tube 18 and moves the fuel particles out of the way so the tube 18 can be rotated.

7. The tube 18 is then rotated moving the cutouts 54 away from the cavity 44 input and sealing each one against the other. The tube 18 can be made out of many materials that can provide a good seal between cells 44. It can be coated with a pliable material if necessary.

8. The fuel cell 16 is then ready for operation and the piping subsystem 22 may be disconnected.

Consequently, while the foregoing description has described the principle and operation of the present invention in accordance with the provisions of the patent statutes, it should be understood that even though these numerous characteristics and advantages of the invention have been set forth in the foregoing description, together with details of the structure and function of the invention, the disclosure is illustrative only, and changes may be made in detail, especially in matters of shape, size, chemistry and arrangement of parts within the principal of the invention to the full extent indicated by the broad general meaning of the terms in which the appended claims are expressed.

What is claimed is:

1. A fuel particle feeding mechanism for a refuelable electrochemical device comprising:
   (a) a source of a mixture of a fluid and electrochemically active particles;
   (b) one or more feed tubes, each with at least one wall opening;
   (c) one or more electrochemical cells;
   (d) a system for transferring electrochemically active particles from at least one of the wall openings of the one or more feed tubes into one or more of the electrochemical cells or one or more cavities from which the particles can be fed into the electrochemical cells;
   wherein no more than about 20% of electrochemically active particles exit the feed tube during fueling through other than said system.

2. The apparatus according to claim 1, wherein said input of fluid and particles is provided by a particle feeding system comprising:
   (a) a particle storage system comprising a fluidized bed or other system for storing fluid and electrochemically active particles;
   (b) a connective piping subsystem;
   (c) a plurality of valves;
   (d) one or more pumps; and
   (e) a fluid reservoir,
   wherein said particle storage system is connected to the connective piping subsystem through a plurality of valves, and wherein one said pump provides the driving force at the beginning of the refueling to move electrolyte and particles from said particle storage means into said particle feed mechanism and return said fluid to the fluid reservoir to begin another refueling operation when needed, and wherein said plurality of valves open or close said feed system when necessary, and wherein said fluid reservoir provides the fluid to said feed system, and wherein said particle storage means provides the fuel to refuel said fuel particle feed mechanism.

3. The apparatus according to claim 2, wherein said plurality of valves further comprises:
   (a) a first valve
   (b) a second valve;
   (c) a third valve;
   (d) a fourth valve; and
   (e) a fifth valve
   wherein said first valve is located between said particle storage means and one said pump, and wherein said second valve is located between said one or more feed tubes and said pump, and wherein said third valve is located between said particle storage means and said one or more feed tubes, and wherein said fourth valve is located between said electrochemical cells and said fluid reservoir, and wherein said fifth valve is located between said electrochemical cells and said particle storage means.

4. The apparatus according to claim 2, wherein said particle storage means is a spouted bed.

5. The apparatus according to claim 1, wherein said system for transferring said particles includes one or more feed tubes adjacent to or intersecting a portion of one or more of said electrochemical cells or cavities.

6. The apparatus according to claim 5, wherein said feed tube has an open position and a closed position and further wherein said feed tube has one or more cutouts of such dimensions to enable refueling when the feed tube is in the open position, and when moved into the closed position by rotational or axial motion of the feed tube, to cover the openings from the feed tube into said individual cells or cavities, thereby providing electrical isolation of each of said individual cells or cavities from all others.

7. The apparatus according to claim 1, further comprising a system for operating said feed tube including a motor to rotate said feed tube to enable fluid and particles to flow into said fuel cell.

8. The apparatus according to claim 1, further comprising a system for operating said feed tube that includes a lever or thrusting mechanism.

9. The apparatus according to claim 7, wherein said motor further comprises a feed tube gear and a motor gear, wherein said motor gear is mounted on the motor shaft, and further wherein said feed tube gear is engaged with said motor gear and further wherein said feed tube gear is connected to said feed tube to rotate said feed tube for refueling said electrochemical cells or cavities with fluid and particles.

10. The apparatus according to claim 5, wherein said feed tube or tubes have two stopping means, which constrain movement of each said feed tube in that the rotation or axial translation of each said feed tube is sufficient to open and close each said feed tube over said electrochemical cells or cavities to allow immediate and rapid transfer of particles from each feed tube into said cells or cavities.

11. The apparatus according to claim 1, wherein said system for transferring particles further comprises a fluid bypass, wherein said bypass pierces a portion of said feed tube through a wall of said feed tube, and further wherein said bypass is open to said input of fluid or fluid and particles in said feed tube.

12. The apparatus according to claim 11, wherein said bypass is filtered by a bypass screen, said screen allowing fluid but not particles to pass through the bypass.

13. The apparatus according to claim 5, wherein said feed tube moves rotationally or axially to refuel said individual cells or cavities.

14. The apparatus according to claim 6, wherein said feed tube includes a plurality of cutouts in a portion of said feed tube, wherein said cutouts are located to match the distance between said individual cells or cavities, thereby allowing particles and fluid to pass from the feed tube into said cells or cavities when the feed tube is positioned such that the first such cutout is aligned with the first of said cells or cavities.

15. The apparatus according to claim 14, wherein said feed tube cutouts open or close fluid communication between said individual cells or cavities when said feed tube is moved axially or rotationally, thereby, when closed, isolating each of said cells or cavities and further thereby preventing electrical shorting between said cells when in the closed position.

16. The apparatus of claim 5, further comprising a plurality of seals at the ends of said feed tube, thereby improving the sealing capability of said feed mechanism to prevent leaks of said fluid and particles.

17. The apparatus according to claim 16, wherein said feed tube is coated on its outer surface with a pliable coating thereby ensuring an improved seal between said feed tube and the walls of said individual cells or cavities, thereby ensuring isolation between said cells or cavities, thereby further ensuring no short circuiting will occur between said individual cells or cavities during cell discharge.

18. The apparatus according to claim 1, wherein one or more of said cells or cavities contains a screen near or at the top of each of said cells or cavities, said screen being comprised of a plurality of holes of sufficient diameter to allow fluid to pass through during refueling and exit said cell or cavity, yet also of small enough diameter to prevent particles entering said cells or cavities from passing through said screen.

19. The apparatus according to claim 18, wherein the apertures in said screen are between about 0.001 inches and about 0.080 inches in diameter.

20. The apparatus according to claim 18, wherein said screen separates a region across the top of each cell or cavity from the remainder of the cell or cavity such that particles are prevented from entering said region, which is connected to the fluid exit of the cell or cavity.

21. The apparatus according to claim 20, wherein said region has a cross-sectional area between about 0.006 square inches and about 1.0 square inch.

22. The apparatus according to claim 5, wherein the walls of said cells or cavities are of such shape to be each in direct contact with said feed tube at three to ten points of contact, rather than in continuous contact about the circumference of said feed tube.

23. The apparatus according to claim 5, wherein said system for transferring particles includes two feed tubes adjacent to or intersecting one or more of said cells or cavities near opposite ends or corners of the top of each of said cells or cavities.

24. The apparatus according to claim 5, wherein said system for transferring particles includes a feed tube adjacent to or intersecting one or more of said cells or cavities near the center of the top or near an upper corner of each of said cells or cavities.

25. A fuel particle feed mechanism for a refuelable electrochemical device comprising:

(a) an input of fluid and electrochemically active particles;

(b) one or more feed tubes;

(c) one or more electrochemical cells;

(d) means for inputting said fluid and particles into said feed tube;

(e) means for operating said feed tube; and (f) means for transferring electrochemically active particles from the feed tube into one or more of the electrochemical cells or one or more cavities from which the particles can be fed into the electrochemical cells.

(g) means for ensuring at least 20% of the fluid entering said one or more feed tubes enters said cells or cavities during refueling.

26. A method of refueling a refuelable electrochemical device having one or more electrochemical cells comprising at least the steps of:

(a) providing an input of fluid and electrochemically active particles;

(b) operating a feed tube within said device to allow particles to transfer from said feed tube to other parts of the device;

(c) pumping said fluid and particles into said device via the feed tube;

(d) pumping said fluid through said feed tube to clear it of particles; and (f) operating said feed tube to isolate it from the remainder of the device and to electrically isolate each electrochemical cell in the device from all others.

27. The method of refueling an electrochemical power source according to claim 26, wherein said step of operating said feed tube include rotating or axially moving said feed tube to be in an open position for electrolyte and fuel particle filling, and rotating or axially moving said feed tube to be in a closed position to provide electrical isolation between cells during power source discharge such that the power source is not short circuited.

28. The method according to claim 26 wherein a pressure sensor placed upstream of the device is used to determine when to proceed from step (c) to step (d).

29. The method according to claim 26 wherein optical, electrical, or mechanical means are used to determine when to proceed from step (c) to step (d) by detecting particles in said feed tube.

30. The method according to claim 26, further comprising using flow rate or pressure drop through a fluid bypass channel to determine when to proceed from step (c) to step (d).

31. The mechanism according to claim 25 wherein said means for ensuring at least 20% of the fluid entering said one or more feed tubes enters said cells or cavities during refueling, is increased to means for ensuring at least 50% of the fluid entering said one or more feed tubes enters said cells or cavities during refueling.

32. A fuel particle dispensing system including one or more electrochemical cells, each arranged longitudinally along and substantially within a plane in a container, each of the cells having a cell cavity, the system comprising:

a source of fuel particles; and a dispenser coupled to the source for dispensing the particles along a flow path into the cell cavities and substantially parallel to the plane.

33. The system of claim 32 wherein the dispenser dispenses a mixture of particles and fluid.

34. The system of claim 33 wherein the fluid is a gas.

35. The system of claim 33 wherein the fluid is a liquid.

36. The system of claim 35 wherein the liquid is an electrolyte.

37. The system of claim 32 wherein the dispenser dispenses the particles through a pneumatic flow.

38. The system of claim 32 wherein the dispenser dispenses the particles through a hydraulic flow.

39. The system of claim 33 further comprising an exit for fluid through the container situated along the flow path.

40. The system of claim 39 further comprising a barrier for blocking passage of particles through the exit.

41. The system of claim 32 configured to selectively allow flow through the dispenser is a direction substantially perpendicular to the plane of the cell cavities.

42. The system of claim 32 wherein the cell cavities are defined by a plurality of spaced cell walls.

43. The system of claim 42 wherein the cell walls include supported cathode membranes.

44. The system of claim 43 wherein the cell membranes are supported by metal foam.

45. A method for dispensing fuel particles into one or more electrochemical cells, each having a cell cavity and arranged longitudinally in a container along and substantially within a plane, the method comprising the following steps:

providing a flow into the cell cavities in a direction substantially parallel to the plane;

distributing the particles into the cell cavities using the flow; and continuing the distribution of particles until the cell cavities are substantially filled.

46. The method of claim 45 further comprising selectively providing a flow in a direction substantially perpendicular to the plane of the cell cavities.

47. The method of claim 45 wherein the flow is a pneumatic flow.

48. The method of claim 45 wherein the flow is a hydraulic flow.

49. The method of claim 45 wherein the flow occurs through a flow medium.

50. The method of claim 49 wherein the flow medium is gas.

51. The method of claim 49 wherein the flow medium is liquid.

52. The method of claim 49 wherein the flow medium is a fluid.

53. The mechanism of claim 1 wherein the fluid is an electrolyte.

54. The mechanism of claim 25 wherein the fluid is an electrolyte.

55. The method of claim 26 wherein the fluid is an electrolyte.

* * * * *